(12) United States Patent
Sugano et al.

(10) Patent No.: US 7,669,767 B2
(45) Date of Patent: Mar. 2, 2010

(54) TAG ACCESS CONTROL SYSTEM, TAG ACCESS CONTROL METHOD AND TAG ACCESS CONTROL PROGRAM

(75) Inventors: Hiroyasu Sugano, Kawasaki (JP); Kazuki Matsui, Kawasaki (JP); Hideto Kihara, Kawasaki (JP); Noboru Iwayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 393 days.

(21) Appl. No.: 11/717,761

(22) Filed: Mar. 14, 2007

(65) Prior Publication Data
US 2007/0215702 A1 Sep. 20, 2007

(30) Foreign Application Priority Data
Mar. 20, 2006 (JP) .............................. 2006-076664

(51) Int. Cl.
*G06K 7/08* (2006.01)
(52) U.S. Cl. .................. 235/451; 235/492; 235/435
(58) Field of Classification Search .................. 235/451, 235/492, 435, 487
See application file for complete search history.

(56) References Cited

U.S. PATENT DOCUMENTS
2006/0027653 A1* 2/2006 Sato et al. ..................... 235/435

FOREIGN PATENT DOCUMENTS
JP 2004-082432 3/2004

* cited by examiner

*Primary Examiner*—Edwyn Labaze
(74) *Attorney, Agent, or Firm*—Staas & Halsey LLP

(57) ABSTRACT

A tag access control system capable of setting an appropriate parameter for controlling a reader/writer can be provided. The tag access control system includes a control portion that controls data communication between an IC tag and a reader/writer by sending a command to the reader/writer in accordance with a parameter and receiving an execution result; and a parameter adjustment portion that adjusts the parameter to an appropriate value. The parameter adjustment portion includes a parameter change portion that changes the parameter a plurality of times, a result storage portion that records execution results of commands based on a plurality of parameters that are changed and a calculation portion that calculates an appropriate parameter based on the execution results stored in the result storage portion.

3 Claims, 17 Drawing Sheets

FIG. 4

| Parameter name | Value |
|---|---|
| Corrected parameter(tp) | 3msec |
| ... | ... |

FIG. 5A | READ | 0(offset) | 10(byte count) |

FIG. 5B | WRITE | 0(offset) | 10(byte count) | Data1 (data) |

| ID =0001 | 1st | Time | 0 | 50 | 100 | 150 | 200 | 250 | 300 |
|---|---|---|---|---|---|---|---|---|---|
| | | Result | 0 | 0 | 0 | 1 | 2 | 1 | 0 |
| | 2nd | Time | 0 | 50 | 100 | 150 | 200 | 250 | 300 |
| | | Result | 0 | 2 | 1 | 1 | 0 | 0 | 0 |
| | 3rd | Time | 0 | 50 | 100 | 150 | 200 | 250 | 300 |
| | | Result | 0 | 0 | 3 | 1 | 0 | 0 | 0 |
| | 4th | Time | 0 | 50 | 100 | 150 | 200 | 250 | 300 |
| | | Result | 0 | 0 | 0 | 0 | 1 | 2 | 0 |

FIG. 7A

| ID | Parameter |
|---|---|
| 0001 | tp=30 |
| 0002 | tp=40 |
| 0003 | tp=30 |
| 0004 | tp=20 |
| 0005 | tp=10 |
| ... | ... |

FIG. 7B

| Parameter name | Antenna ID | Value |
| --- | --- | --- |
| Correction parameter($t_{p1}$) | A1 | 30 milliseconds |
| Correction parameter($t_{p2}$) | A2 | 40 milliseconds |
| Correction parameter($t_{p3}$) | A3 | 20 milliseconds |
| Expected tag number M | all | 4 |
| ... | ... | ... |
| Access time increasing rate h | all | 1.2 |
| ... | ... | ... |

FIG. 15

| t₁ (ID) | READ | 0 (offset) | 10 (byte count) |
|---|---|---|---|
| t₂ | READ | 0 | 10 |
| t₃ | READ | 0 | 10 |
| ... | ... | ... | ... |
| tᵢ | READ | 0 | 10 |

FIG. 16A

| t₁ (ID) | READ | 0 | ... | 5 | 5 | ... | 5 |
|---|---|---|---|---|---|---|---|
| t₂ | READ | 0 | | 5 | 5 | | 5 |
| t₃ | READ | 0 | | 5 | 5 | | 5 |
| tᵢ | READ | 0 | | 5 | 5 | | 5 |

FIG. 16B

| t₂ | READ | 0 | ... | 5 | 5 | ... | 5 |
|---|---|---|---|---|---|---|---|
| t₃ | READ | 0 | | 5 | 5 | | 5 |
| tᵢ | READ | 0 | | 5 | 5 | | 5 |

FIG. 16C

| ID | Division number | Completion | Divided command | | | |
|---|---|---|---|---|---|---|
| $t_1$ | m | 1 | – | | | |
| $t_2$ | n | 0 | $J_1$ | $J_2$ | ... | $J_n$ |
| $t_3$ | n | 0 | $J_1$ | $J_2$ | ... | $J_n$ |
| ⋮ | | | | | | |
| $t_i$ | | 1 | – | | | |
| ⋮ | | | | | | |

FIG. 17

| Group ID | Completion | ID of member IC tag | | | |
|---|---|---|---|---|---|
| $G_1$ | 1 | | | | |
| $G_2$ | 0 | $t_1$ | $t_2$ | ... | $t_i$ |
| ⋮ | | | | | |
| $G_j$ | 1 | | | | |

| | | A1 | | | | | | A2 | | | | | | A3 | | | | | |
|---|---|---|---|---|---|---|---|---|---|---|---|---|---|---|---|---|---|---|---|
| ID =0001 | | | | | | | | | | | | | | | | | | | |
| | 1 | Time | 0 | 50 | 100 | 150 | 200 | 250 | 0 | 50 | 100 | 150 | 200 | 250 | 0 | 50 | 100 | 150 | 200 | 250 |
| | | Result | 0 | 0 | 0 | 2 | 1 | 1 | 0 | 3 | 1 | 0 | 1 | 0 | 0 | 0 | 0 | 2 | 1 | 1 |
| | 2 | Time | 0 | 50 | 100 | 150 | 200 | 250 | 0 | 50 | 100 | 150 | 200 | 250 | 0 | 50 | 100 | 150 | 200 | 250 |
| | | Result | 0 | 2 | 2 | 0 | 0 | 0 | 0 | 0 | 0 | 2 | 1 | 1 | 1 | 1 | 1 | 1 | 0 | 0 |
| | 3 | Time | 0 | 50 | 100 | 150 | 200 | 250 | 0 | 50 | 100 | 150 | 200 | 250 | 0 | 50 | 100 | 150 | 200 | 250 |
| | | Result | 0 | 0 | 1 | 3 | 0 | 0 | 1 | 2 | 1 | 0 | 0 | 0 | 0 | 2 | 1 | 0 | 0 | 0 |
| | 4 | Time | 0 | 50 | 100 | 150 | 200 | 250 | 0 | 50 | 100 | 150 | 200 | 250 | 0 | 50 | 100 | 150 | 200 | 250 |
| | | Result | 1 | 0 | 1 | 1 | 1 | 0 | 0 | 0 | 1 | 3 | 0 | 0 | 0 | 0 | 1 | 3 | 0 | 0 |

FIG. 21B

| ID | Parameter for A1 | Parameter for A2 | Parameter for A3 |
|---|---|---|---|
| 0001 | tp1=30 | tp2=20 | tp3=30 |
| 0002 | tp1=20 | tp2=30 | tp3=40 |
| 0003 | tp1=30 | tp2=30 | tp3=30 |
| 0004 | tp1=30 | tp2=30 | tp3=20 |
| 0005 | tp1=30 | tp2=30 | tp3=10 |
| ... | | | ... |

TAG ACCESS CONTROL SYSTEM, TAG ACCESS CONTROL METHOD AND TAG ACCESS CONTROL PROGRAM

BACKGROUND OF THE INVENTION

1. Field of the Invention

The present invention relates to a tag access control system, a tag access control method and a tag access control program for controlling data communication between an IC tag provided in a moving article and a reader/writer.

2. Description of Related Art

In recent years, attention has been given to an RFID (Radio Frequency Identification) technology for recognizing an article using an IC tag. For example, in a factory or a distribution center, articles such as components or products are transported by a belt conveyor, a forklift, a hand truck or the like. By providing such articles with IC tags, it is possible to identify and manage the transported articles. In particular, passive-type IC tags require no batteries, so that the reduction of size and price can be achieved. Accordingly, they are expected to suit the identification and management of a large volume of articles.

The passive-type IC tag exchanges data by radio with a reader/writer having an antenna. An operation of detecting an IC tag and an operation of reading/writing data with respect to the IC tag by the reader/writer are controlled by an access control system. For instance, when an access control system transmits a command for allowing data communication with an IC tag to a reader/writer, the reader/writer executes the command and sends a result of the command to the access control system as a reply.

The access control system records a parameter for controlling a reader/writer beforehand, and sends a command to the reader/writer in accordance with the parameter. The parameter includes, for example, a timing parameter of detecting of an IC tag by the reader/writer or the number of IC tags detected collectively. For instance, the parameter indicating timing of detecting an IC tag is adjusted, whereby the timing of detecting the IC tag by a reader/writer can be controlled. Such a parameter should be set appropriately.

This is because it is important for the access control system to send an appropriate command at appropriate timing to a reader/writer in order to ensure the data communication with an IC tag. For instance, in the case where data communication is conducted with IC tags attached to a plurality of articles moving over a belt conveyor or the like, antennas of reader/writers are provided along a moving path of the articles. In this case, the access control system has to control the reader/writer so as to ensure detecting the IC tags and reading and writing data while the articles are within the communication ranges of the antennas.

To this end, JP 2004-82432 A, for example, has disclosed a label printer that controls a plurality of reader/writers, thereby reducing a writing failure rate while maintaining a recording velocity.

SUMMARY OF THE INVENTION

However, in the case where a reader/writer accesses IC tags attached to moving articles in a factory or a distribution center, an appropriate parameter for transmitting an appropriate command at appropriate timing depends on the environment of the site. For instance, an appropriate parameter will vary in accordance with the environment of the site to which the access control system is applied, including the quantity of components, a moving velocity, electromagnetic field surrounding the antennas and the like. For that reason, in most cases, an appropriate parameter cannot be found until the operation of a tag access control system is effected actually.

As things stand now, a system engineer, a person in charge of an access control system on site or the like has to find out and set an appropriate parameter by trial and error on an actual site. Such a job for finding out an appropriate parameter while repeating tests again and again on a site is extremely complicated. Therefore, there is a problem that setting an appropriate parameter becomes a terrible burden on a system engineer and a person in charge on site.

Therefore, with the foregoing in mind, it is an object of the present invention to provide a tag access control system, a tag access control method and a tag access control program capable of setting an appropriate parameter for controlling a reader/writer.

A tag access control system of the present invention is for controlling data communication between a reader/writer having an antenna and an IC tag provided in an article moving within a communication range of the antenna. The tag access control system includes: a parameter recording portion that records a parameter for controlling the data communication; a control portion that controls the data communication between the IC tag and the reader/writer by sending a command for making the reader/writer access the IC tag based on the parameter and receiving an execution result of the command from the reader/writer; and a parameter adjustment portion that adjusts the parameter to an appropriate value. The parameter adjustment portion includes: a parameter change portion that changes the parameter a plurality of times; a result storage portion that records a plurality of execution results of commands that the control portion sends based on a plurality of parameters that are changed by the parameter change portion, the execution results respectively being associated with the parameters on which the commands are based; and a calculation portion that calculates an appropriate parameter based on the parameters and the execution results of the commands stored in the result storage portion.

The parameter change portion changes the parameter a plurality of times. Every time the parameter is changed, the control portion sends a command based on the changed parameter to the reader/writer, and obtains the execution result. The result storage portion associates, for each of the thus changed plurality of parameters, an execution result of the command with the parameter on which the command is based, and records them. In other words, the result storage portion records various parameters that are associated with execution results of commands based on the parameters. Thus, the calculation portion can calculate an appropriate parameter enabling the improvement of the command execution result based on the data recorded in the result storage portion. As a result, the parameter adjustment portion can set an appropriate parameter for allowing the control portion to control the reader/writer.

In the tag access control system according to the present invention, preferably, the calculation portion calculates the appropriate parameter by selecting, among the parameters stored in the result storage portion, a parameter with the highest probability that a command corresponding to the parameter is successfully executed.

Thereby, the calculation portion can calculate an optimum parameter by a simple calculation process.

In the tag access control system according to the present invention, preferably, the parameter change portion selects a parameter with a higher probability that a command corresponding to the parameter is successfully executed based on parameters and execution results of commands that have been already stored in the result storage portion, and sets the selected parameter as a parameter after change.

Thereby, the parameter change portion can feedback the execution results of the commands that have been already recorded in the result storage portion to a parameter after change, so as to increase the probability of the parameter after change that the execution result is improved. As the parameter change portion changes the parameter in such a manner a plurality of times, the parameter becomes closer to an appropriate value.

In the case where a plurality of the reader/writers each having an antenna are provided, and the antennas are disposed along a moving path of the article, preferably, the tag access control system of the present invention further includes: a command accepting portion that accepts, from an upper system, a command indicating an instruction to write data in the IC tag or an instruction to read data from the IC tag; and a returning portion that returns a result of processing the accepted command to the upper system. The parameter recording portion records a parameter for controlling data communication by each of the plurality of reader/writers. The control portion includes a division portion that generates a plurality of divided commands for executing an instruction indicated by the command, and the control portion controls data communication between the plurality of reader/writers and the IC tag by sending the plurality of divided commands to the plurality of reader/writers successively based on the parameter and receiving an execution result of each of the plurality of divided commands from each of the plurality of reader/writers. In the parameter adjustment portion, the parameter change portion changes the parameter concerning the plurality of reader/writers a plurality of times, the result storage portion records execution results of the plurality of divided commands that the control portion sends to the plurality of reader/writers based on each of a plurality of parameters that are changed by the parameter change portion, the execution results respectively being associated with the parameters on which the divided commands are based. The calculation portion calculates an appropriate parameter for the plurality of reader/writers based on the parameters and the execution results of the divided commands stored in the result storage portion.

Since the control portion sends and assigns the plurality of divided commands generated by the division portion to the plurality of reader/writers successively, one command accepted by the command accepting portion can be distributed to the plurality of reader/writers for execution. The antennas respectively provided in the plurality of reader/writers are disposed along the moving path of the IC tag. Therefore, when the article to which the IC tag is attached moves successively in the communication ranges of the plurality of antennas, the divided commands for executing the command with respect to the IC tag are distributed to the reader/writers and executed. The control portion assigns the divided commands in accordance with the parameter concerning the plurality of reader/writers recorded in the parameter recording portion. Thus, when the parameter adjustment portion sets an appropriate parameter for the plurality of reader/writers, the divided commands can be assigned to appropriate reader/writers at appropriate timing. That is to say, while the control portion distributes the processing of the command to the plurality of reader/writers, the parameter adjustment portion sets a parameter for allowing the plurality of reader/writers to conduct an appropriate distributed process, and therefore the efficiency as well as the certainty of the process can be enhanced.

In the case where there are a plurality of reader/writers to be controlled and one command is to be distributed to the plurality of reader/writers, there is a need to set an appropriate parameter for each of the reader/writers. In such a case, the parameter adjustment portion can calculate an appropriate parameter for each of the reader/writers, and therefore the efficiency of providing and managing the tag access control system can be enhanced as compared with the case of controlling only one reader/writer.

A tag access control method of the present invention is for controlling data communication between a reader/writer having an antenna and an IC tag provided in an article moving within a communication range of the antenna using a computer. The tag access control method includes the steps of: a step in which a parameter change portion provided in the computer changes a parameter for controlling the data communication a plurality of times, the parameter being recorded in a parameter recording portion provided in the computer; a step in which a control portion provided in the computer sends a plurality of commands that make the reader/writer access the IC tag based on a plurality of parameters changed by the parameter change portion and receives a plurality of execution results of the commands; a step in which the control portion records the plurality of execution results associated with the parameters on which the commands are based, in a result storage portion provided in the computer; and a step in which a calculation portion provided in the computer calculates an appropriate parameter based on the parameters and the execution results of the commands stored in the result storage portion.

A recording medium storing a tag access control program of the present invention is for making a computer execute the following processes that control data communication between a reader/writer having an antenna and an IC tag provided in an article moving within a communication range of the antenna: a parameter change process in which a parameter for controlling the data communication is changed a plurality of times, the parameter being recorded in a parameter recording portion provided in the computer; a process in which a plurality of commands that make the reader/writer access the IC tag are generated based on a plurality of parameters changed by the parameter change process and are sent to the reader/writer, and a plurality of execution results of the commands are received; a process in which the plurality of execution results associated with the parameters on which the commands are based are recorded in a result storage portion provided in the computer; and a process in which an appropriate parameter is calculated based on the parameters and the execution results of the commands stored in the result storage portion.

According to the present invention, a tag access control system, a tag access control method and a tag access control program capable of setting an appropriate parameter for controlling a reader/writer can be provided.

These and other advantages of the present invention will become apparent to those skilled in the art upon reading and understanding the following detailed description with reference to the accompanying figures.

BRIEF DESCRIPTION OF THE DRAWINGS

FIG. 4 shows one example of the data recorded in a parameter recording portion 13.

FIG. 5A shows an example of a command to read data from an IC tag, and FIG. 5B shows an example of a command to write data to an IC tag.

FIG. 7A shows one example of data indicating execution results and FIG. 7B shows one example of a table where IDs and parameters are associated with each other and recorded.

FIG. 15 shows an exemplary table showing parameters recorded in a parameter recording portion 13a.

FIG. 16A illustrates an example of a job list, FIG. 16B illustrates an example of a job list newly generated by the command division process and FIG. 16C illustrates an example of a job list obtained by deleting the successful divided commands.

FIG. 17 illustrates an example of data representing the results of processing the divided commands.

FIG. 18 illustrates an example of data representing the result of processing for each tag group.

FIG. 21A shows one example of data indicating execution results and FIG. 21B shows one example of a table where IDs and execution results are associated with each other and recorded.

DETAILED DESCRIPTION OF THE INVENTION

The following describes one embodiment of the present invention in details, with reference to the drawings.

Embodiment 1

Figure 1:
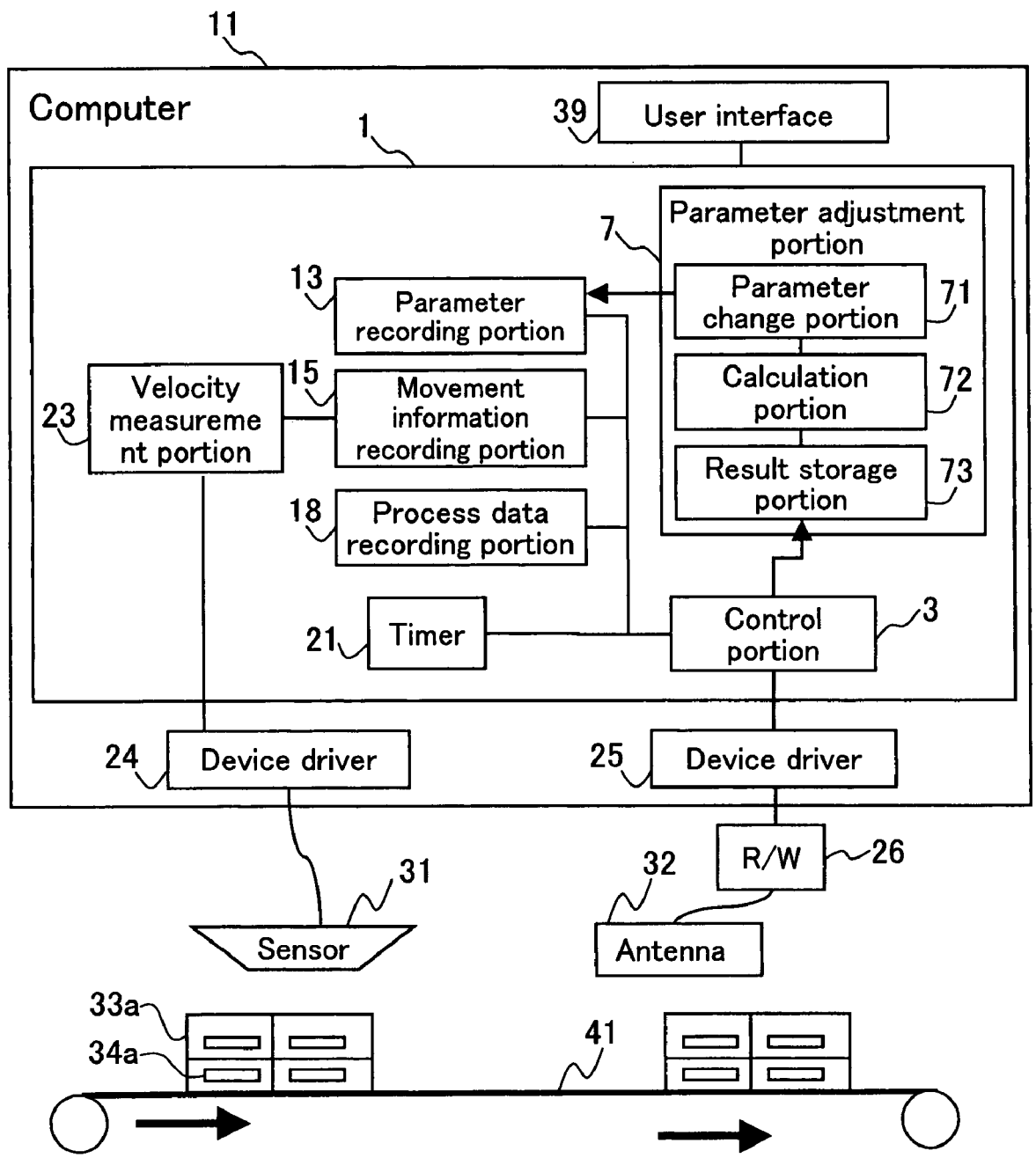
FIG. 1 is a functional block diagram showing the overall configuration of a system including a tag access control system according to Embodiment 1.

FIG. 1 is a functional block diagram showing the overall configuration of an IC tag access system including a tag access control system of the present embodiment. The tag access control system 1 of FIG. 1 is implemented by a computer 11 executing tag access control in accordance with predetermined software. The tag access control system 1 includes a control portion 3, a parameter adjustment portion 7, a parameter recording portion 13, a movement information recording portion 15, a process data recording portion 18, a timer 21 and a velocity measurement portion 23.

The computer 11 is connected with a sensor 31 and a reader/writer (hereinafter abbreviated as R/W) 26. The computer 11 is provided with a device driver 24 for controlling the sensor 31, a device driver 25 for controlling the R/W 26 and a user interface 39.

The control portion 3, a parameter change portion 71, a calculation portion 72, the timer 21, the velocity measurement portion 23 and the device drivers 24 and 25 of FIG. 1 are functions executed by the computer 11, which are described as functional blocks. A CPU provided in the computer 11 executes a predetermined program, thereby realizing the functions of these functional blocks. The user interface 39 is implemented by input devices such as a mouse and keyboard and output devices such as a display, a printer and a speaker provided in the computer 11.

The parameter recording portion 13, the movement information recording portion 15, the process data recording portion 18 and a result storage portion 73 are implemented by internal storage devices such as semiconductor memory, a hard disk, a flexible disk and a DVD provided in the computer 11 as well as external storage devices to which the computer 11 is accessible, for example.

The computer 11 can be, for example, a general-purpose computer such as a personal computer, a server or a workstation. Moreover, the computer 11 may be a computer exclusively for an R/W control.

The R/W is a device that sends data to an IC tag and receives response data from the IC tag in response to the sent data, thereby reading data recorded in the IC tag or writing data in the IC tag. The R/W 26 is provided with an antenna 32. The R/W 26 exchanges data with IC tags located within a communication range of the antenna 32 by radio. Although a plurality of antennas may be provided for the R/W 26, the following describes a case of a single antenna provided for the sake of simplicity.

In the illustrated example of FIG. 1, a belt conveyor 41 is disposed so as to pass through the communication range of the antenna 32. Thereby, an article 33a carried on the belt conveyor 41 passes through the communication range of the antenna 32. Since an IC tag 34a is attached to the article 33a, transmission/reception of data is enabled between the R/W 26 and the IC tag 34a by radio when the article 33a is located within the communication range of the antenna 32.

The sensor 31 is provided upstream of the belt conveyor 41. The sensor 31 detects an article moving over the belt conveyor 41 and entering the communication range of the antenna 32. A time duration when the sensor 31 detects the article is recorded in the movement information recording portion 15. Further, the velocity measurement portion 23 measures a velocity of the detected article and records the same in the movement information recording portion 15.

In this way, data regarding the movement state of an IC tag is recorded in the movement information recording portion 15. The data regarding the movement state contains the arrangement of the sensor 31 and the antenna 32. For instance, the data regarding movement contains information such as a position detected by the sensor 31, a position entering the communication range of the antenna 32 on the moving path of the article.

The parameter recording portion 13 records a parameter for controlling data communication between the R/W 26 and an IC tag. The parameter includes information concerning the control of the data communication such as information indicating timing of the data communication, the number of IC tags included in one tag group and a time required for data access to an IC tag. The following description of the present embodiment deals with a parameter that is information showing the timing of data communication as an example.

The parameter is input by a user beforehand via the user interface 39, for example, and is recorded in the parameter recording portion 13, which is then adjusted to an appropriate value by the parameter adjustment portion 7.

The process data recording portion 18 records data exchanged between an IC tag and the tag access control system 1, such as data that the R/W 26 is about to write to the IC tag and data read from the IC tag.

The control portion 3 generates a command for allowing the R/W 26 to perform transmission/reception of data with an IC tag using the parameter recorded in the parameter recording portion 13, the data recorded in the movement information recording portion 15, the data recorded in the process data recording portion 18 and a present time according to the timer 21. The command is conveyed to the R/W 26 through the device driver 25. In this manner, the tag access control system 1 is able to control the R/W 26 in accordance with the motion of an IC tag.

The parameter adjustment portion 7 is provided with the parameter change portion 71, the calculation portion 72 and the result storage portion 73. The parameter change portion 71 changes the parameter recorded in the parameter recording portion 13 in accordance with a procedure indicated by a predetermined program. For instance, the parameter may be changed so that an area within a predetermined range is scanned at predetermined intervals, or the parameter may be changed to a value extracted at random from a predetermined range. Further, the parameter change portion 71 may change the parameter based on the results of the execution and the parameters recorded in the result storage portion 73, which will be described later. The present embodiment describes later an example where the parameter is changed based on the data recorded in the result storage portion 73.

The control portion 3 generates a command using the parameter changed by the parameter change portion 71, and sends it to the R/W 26. The control portion 3 receives an execution result of the command and records the same in the result storage portion 73. The parameter change portion 71 repeats the change of the parameter a plurality of times, and every time the parameter is changed, the control portion 3 executes a command based on the changed parameter. The execution result of the command is associated with the parameter and is recorded in the result storage portion 73. The calculation portion 72 calculates an appropriate parameter based on the execution results for the plurality of parameters recorded in the result storage portion 73. The parameter change portion 71 changes the parameter recorded in the parameter recording portion 13 to the appropriate parameter calculated by the calculation portion 72.

It should be noted that the configuration of the tag access control system 1 is not limited to that shown in FIG. 1. For example, the function of the tag access control system 1 may be distributed to a plurality of computers. Further, a program for embodying the functions of the control portion 3, the parameter change portion 71, the calculation portion 72, the timer 21 and the velocity measurement portion 23 may be installed in the computer 11 through a network or a recording medium, thus making it possible to configure the tag access control system 1.

The following describes the operation conducted by the tag access control system 1. The tag access control system 1 of the present embodiment operates in two modes including an actual operation mode and a parameter adjustment mode. In the actual operation mode, the IC tag access control system 1 operates actually not for a test. The operation in the parameter adjustment mode is a test operation for adjusting a parameter to an appropriate value prior to the actual operation. The switching between these modes is performed by a user through the user interface 39, for example. Firstly, the operation in the actual operation mode will be described below.

(Data Access Process to IC Tag in Actual Operation Mode)

Figure 2:
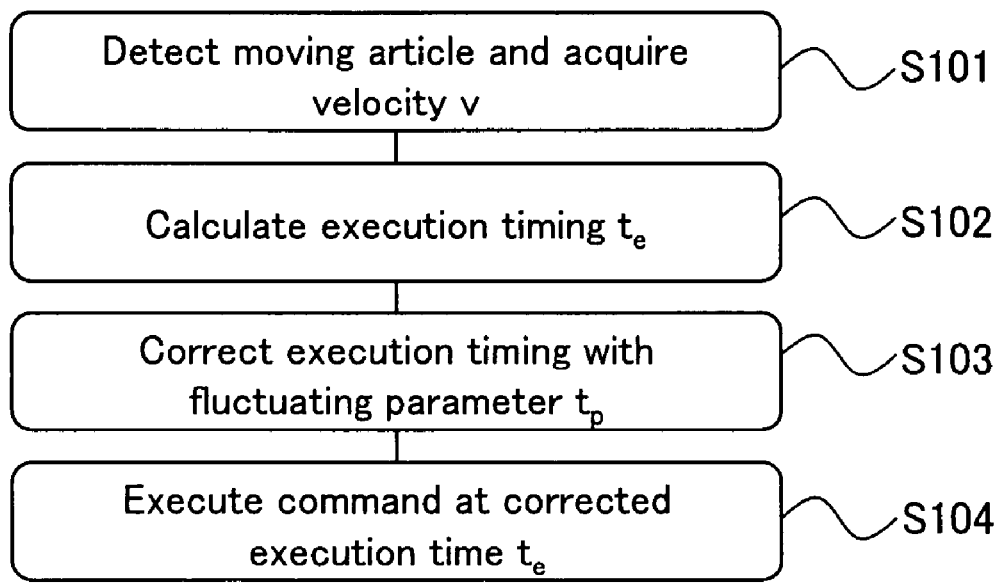
FIG. 2 is a flowchart showing an example of the process in which a tag access control system 1 makes a R/W 26 execute a command.

FIG. 2 is a flowchart showing an example of the process in the actual operation mode in which the tag access control system 1 makes the R/W 26 execute a command for data communication with an IC tag.

Firstly, the sensor 31 detects an article moving over the belt conveyor 41, and the velocity measurement portion 23 measures a velocity v of the article (Step S101). The velocity v and the time $T_0$ when the sensor 31 detects the article are recorded in the movement information recording portion 15.

Next, the control portion 3 calculates an execution time $t_e$ when the command is to be executed by the R/W 26 based on the data recorded in the movement information recording portion 15 and the velocity v measured in Step S101 (Step S102). The following describes an example where the execution time $t_e$ is calculated when the movement information recording portion 15 records information indicating a distance d between a position where the sensor 31 detects the article and a position where the article enters the communication range of the antenna 32.

Figure 3:
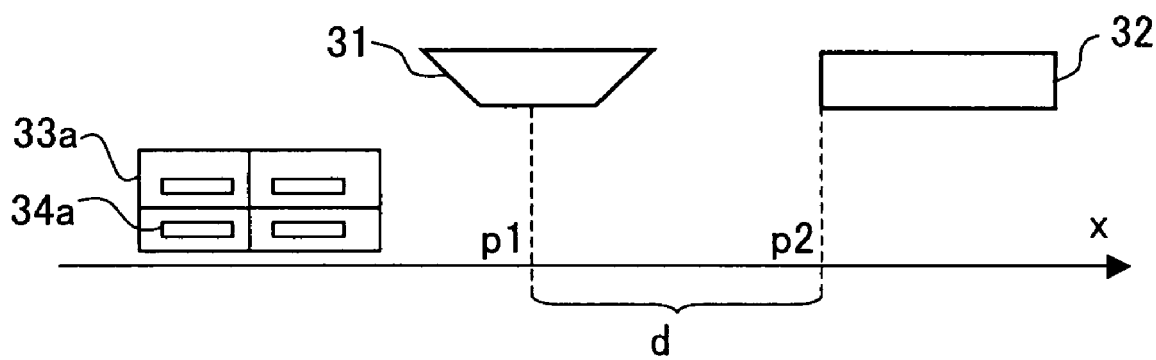
FIG. 3 schematically shows an example of a positional relationship among the moving path of an article, a sensor and an antenna.

FIG. 3 schematically shows an example of a positional relationship among the moving path of the article, the sensor 31 and the antenna 32. In FIG. 3, the X axis shows the moving path of the article. The position p1 indicates the position on the X axis where the sensor 31 detects the article, and the position p2 indicates the position on the X axis where the article enters the communication range of the antenna 32. The article passes through p1 at the time $T_0$, and the distance between p1 and p2 on the X axis is d. In this example, the execution time $t_e$ is calculated as $t_e = T_0 + (d/v)$. The execution time $t_e$ is calculated in terms of milliseconds, for example.

Since the execution time $t_e$ obtained in Step S102 is a theoretical value determined by calculation, the optimum execution time in the actual operation will deviate from the $t_e$. Then, the control portion 3 corrects the execution time $t_e$ using the parameter recorded in the parameter recording portion 13 that shows the timing of the data communication (Step S103). The control portion 3, for example, corrects the execution time $t_e$ by adding a correction parameter $t_p$ to $t_e$. The correction parameter $t_p$ is one example of the parameter indicating the timing of the data communication. The execution time $t_e$ corrected with the correction parameter $t_p$ becomes $t_e = T_0 + (d/v) + t_p$. Thereby, the execution time $t_e$ becomes closer to the time when the article actually enters the communication range of the antenna 32.

FIG. 4 shows one example of the data configuration recorded in the parameter recording portion 13. In the illustrated example of FIG. 4, a parameter name associated with its value is recorded.

The control portion 3 makes the R/W 26 execute the command at the corrected execution time $t_e = T_0 + (d/v) + t_p$. The command, for example, is an instruction to write data to an IC tag or to read data from the IC tag.

FIG. 5A shows an example of the command to read data from an IC tag. The command shown in FIG. 5A includes a READ instruction, an offset indicating a position where the reading is to be started and a byte count indicating the amount of data to be read. The command of FIG. 5A shows an instruction (READ) to read 10 bytes of data from the top (0) of a memory of the IC tag.

FIG. 5B shows an example of the command to write data to an IC tag. The command shown in FIG. 5B includes a WRITE instruction, an offset indicating a position where the writing is to be started, and a byte count indicating the amount of data to be written, as well as data to be written. The command of FIG. 5B shows an instruction (WRITE) to write "Data1" in the region corresponding to 10 bytes from the top (0) of a memory of the IC tag.

The control portion 3 sends the command as shown in FIG. 5A or FIG. 5B to the R/W 26. When receiving the command, the R/W 26 detects an ID of an IC tag located within the communication range of the antenna 32, and performs a reading or a writing operation of data with respect to each IC tag. The R/W can detect IDs of a plurality of IC tags located within the communication range of the antenna provided in the R/W by utilizing a technology called collision arbitration, for example, and can read or write data from/to a tag of each detected ID.

When the R/W 26 executes an operation of reading data with respect to an IC tag, for example, an ID of the IC tag and the read data are returned to the control portion 3 as an execution result. When the R/W 26 executes an operation of writing data with respect to an IC tag, for example, an ID of the IC tag and data indicating whether the writing has succeeded or not are returned to the control portion 3.

The data that the control portion 3 receives from the R/W 26 is recorded in the result storage portion 73 of the parameter adjustment portion 7 as an execution result of the command, which can be utilized in the parameter adjustment process by the parameter adjustment portion 7 as described later. The data recorded as the execution result includes an ID of an IC tag, the number of IC tags processed by one command, a size of data read from an IC tag, a size of data written in an IC tag, a time required for executing one command, a time when a command is executed and the like.

(Parameter Adjustment Process in Parameter Adjustment Mode)

Figure 6:
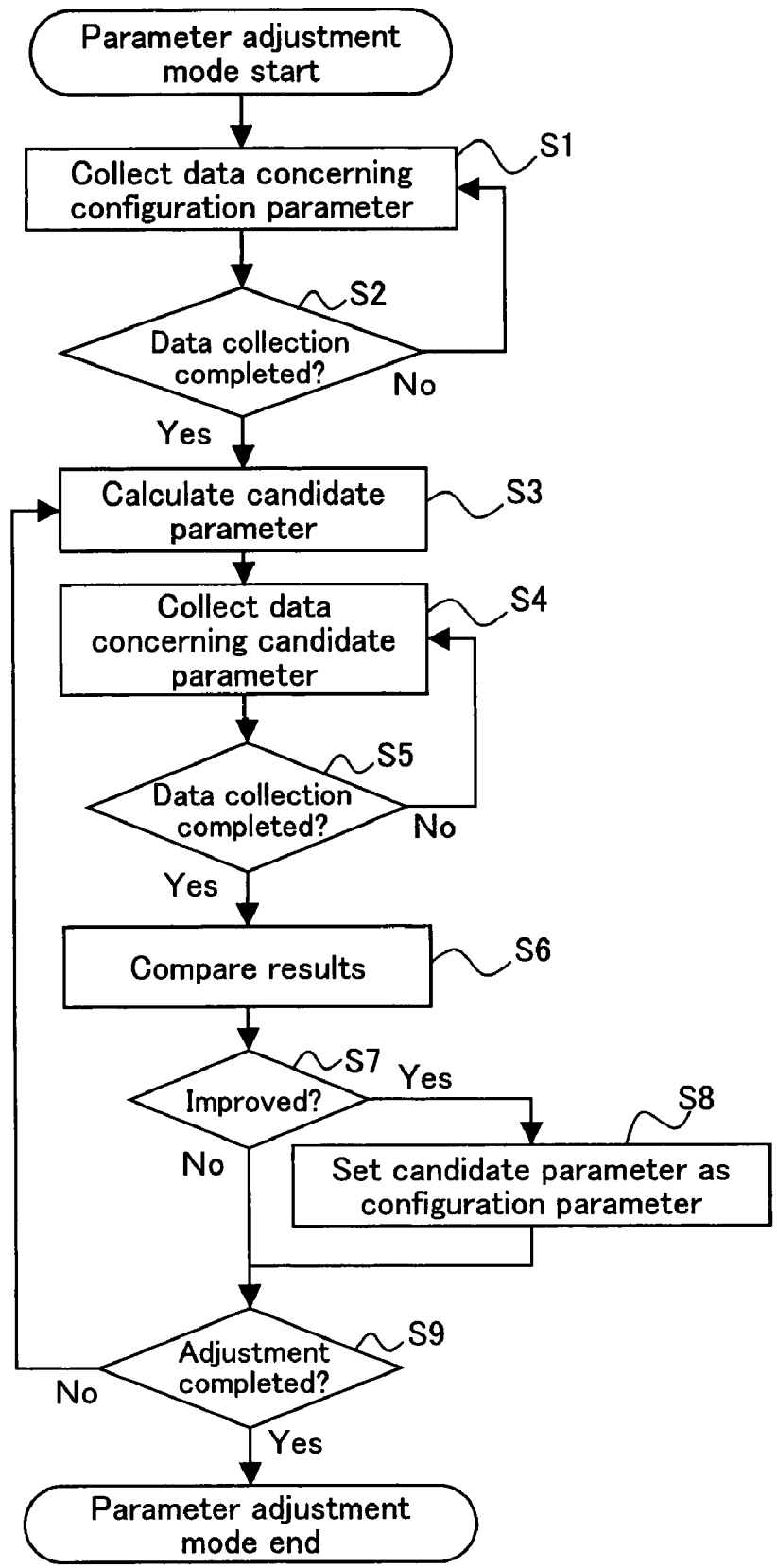
FIG. 6 is a flowchart showing one example of the process for determining an appropriate value while adjusting a parameter.

The following describes an example of the operation conducted by the tag access control system 1 in the parameter adjustment mode. FIG. 6 is a flowchart showing one example of the process for determining an appropriate value while adjusting a parameter in the parameter adjustment mode.

To begin with, a flow of the process will be described below briefly. The parameter adjustment portion 7 collects an execution result for each of the parameter recorded in the parameter recording portion 13 (hereinafter called a configuration parameter) and parameters after change as candidates calculated by the parameter change portion 71 in order to change the configuration parameter (hereinafter called candidate parameters). A comparison is made among these execution results, and when it is judged that the execution result can be improved by a certain candidate parameter, the configuration parameter is changed to such a candidate parameter. By repeating this process a plurality of times, the configuration parameter can be closer to an appropriate value.

The following describes the process of FIG. 6 in details, explaining an example where a parameter to be adjusted by the parameter adjustment portion 7 is the correction parameter $t_p$ shown in FIG. 4.

When the parameter adjustment mode is started, the control portion 3 generates a command based on the configuration parameter recorded in the parameter recording portion 13, and collects data indicating an execution result when the command is executed by the R/W 26 (Step S1). The control portion 3 repeats the execution of the command a plurality of times to obtain a plurality of execution results (Step S2).

For instance, the control portion 3 makes the R/W 26 execute a command to read data from an IC tag at the execution time $t_e = T_0 + (d/v) + t_p$ after the sensor 31 detects an article. After that, while the article passes through the communication range of the antenna 32, the control portion 3 makes the R/W 26 execute the same command repeatedly. The control portion 3 records, for each command, the number of IC tags for which data has been read successfully in the result storage portion 73 as an execution result. In this way, a series of commands that are executed while an article passes through the communication range of the antenna 32 after the sensor 31 detects the article is considered as one cycle. The control portion 3 repeats this cycle a plurality of times, whereby execution results of the configuration parameter for a plurality of cycles can be recorded in the result storage portion 73. The configuration parameter and the execution results are associated with each other and are recorded.

FIG. 7A shows one example of data indicating execution results recorded in the result storage portion 73. An ID is assigned to the data of the execution results of FIG. 7A in order to recognize what types of parameters are indicated by the execution results. For instance, in the case where there are a plurality of execution results of a command executed based on one parameter, the same ID is assigned to these execution results of the command (In FIG. 7A, ID=0001).

Each recorded ID has a value of the parameter associated therewith. FIG. 7B shows one example of a table where IDs and parameters are associated with each other and recorded. In FIG. 7B, each recorded ID has a value of the parameter $t_p$ associated therewith. It should be noted that a plurality of parameters may be associated with an ID and recorded. For instance, since the optimum value of the parameter $t_p$ may change as the moving velocity v of the article changes, a parameter $t_p$ may be recorded for each of a plurality of different moving velocity zones.

The data of the execution results in FIG. 7A correspond to the ID (=0001). This shows the command execution results for the value of the parameter corresponding to ID=0001 of FIG. 7B, i.e., $t_p = 30$.

In the illustrated example of FIG. 7A, the time when the command is executed and the result of the command execution are associated with each other and recorded for the first to fourth cycles. The command execution time is represented in terms of the elapsed time from the execution time $t_e = T_0 + (d/v) + t_p$ regarded as the time "0" (in terms of milliseconds). The results of the command execution are represented in terms of the number of IC tags processed by the command execution. Although the illustrated example of FIG. 7A shows the case where the command is executed at time intervals of 50 milliseconds for the sake of simplicity, the execution intervals of the command in general are irregular, and the actually execution time may be recorded.

The data of FIG. 7A shows that, for example, the command execution at the time "0" in the first cycle results in 0 piece of tag processed. Similarly, the number of IC tags successfully processed by the command executed at the time "50" is "0". The number of IC tags processed by the command are "0" at the time "100", "1" at the time "150", "2" at the time "200", "1" at the time "250" and "0" at the time "300", respectively.

When the execution results corresponding to the four cycles are recorded in the result storage portion 73 as shown in FIG. 7A, for example, the parameter change portion 71 calculates a candidate parameter using the execution results recorded in the result storage portion 73 (Step S3). The candidate parameter is a candidate for the configuration parameter after change. The parameter change portion 71, for example, extracts the execution timing having the best execution result based on the execution results recorded in the result storage portion 73, and calculates a candidate parameter so as to increase a probability of the candidate parameter being a value indicating around such as execution timing. The process for calculating a candidate parameter will be described later in details. The calculated candidate parameter is associated with the ID and is recorded in the result storage portion 73. For instance, the candidate parameter and the corresponding ID are added to the table of FIG. 7B. Herein, it is assumed that the parameter $t_p$=40 is one of the candidate parameters for ID=002.

Under the control of the control portion 3, a plurality of commands are executed based on the candidate parameter (e.g., $t_p$=40) calculated by the parameter change portion 71, and the control portion 3 collects data indicating the execution results (Steps S4, S5). The data indicating the execution results are recorded in the result storage portion 73. The process in Steps S4 and S5 are conducted in a similar manner to the process of the above-stated Steps S1 and S2. The execution results collected in Steps S4 and S5 also are recorded to have a configuration similar to that of the data of FIG. 7A. At this time, the data of the execution results are associated with the ID (=0002) of the candidate parameter calculated in Step S3 and recorded.

When the results of the command execution based on the candidate parameter are recorded, the calculation portion 72 compares the results of the command execution based on the candidate parameter and the result of the command execution based on the configuration parameter (Step S6). The present embodiment describes later an example where the execution results including the number of IC tags successfully accessed, the number of times of failure in accesses in spite of command execution, the number of commands required for accesses to a predetermined number of IC tags are used for the comparison.

It should be noted here that the execution results to be compared are not limited these examples. For instance, data indicating success or failure of a command, a size of the accessed data, a time required for access, a process efficiency and the like may be used as the execution results for comparison.

In the comparison process (Step S6), if it is judged that the execution result is improved (Yes in Step S7), the parameter change portion 71 records the candidate parameter as the configuration parameter in the parameter recording portion 13 (Step S8). If it is judged that the execution result is not improved (No in Step S7), the configuration parameter recorded in the parameter recording portion 13 is not changed.

After that, the calculation portion 72 judges whether or not the parameter adjustment is to be completed (Step S9). In Step S9, if the judgment of no improvement continues a predetermined number of times or more in the comparison process in Step S6, the calculation portion 72 can judge that the parameter adjustment process should be completed. Alternatively, an input from a user indicating whether or not to complete the parameter adjustment may be accepted through the user interface 39.

The process from Steps S3 to S8 is repeated until it is judged that the parameter adjustment should be completed (Yes in Step S9). As the process from Steps S3 to S8 is repeated, the improvement of the parameter in the parameter recording portion 13 also is continued. As a result, the command execution result based on the parameter in the parameter recording portion 13 also is improved. That is, the parameter in the parameter recording portion 13 can be adjusted to an appropriate value.

(Comparison Process)

Figure 8:
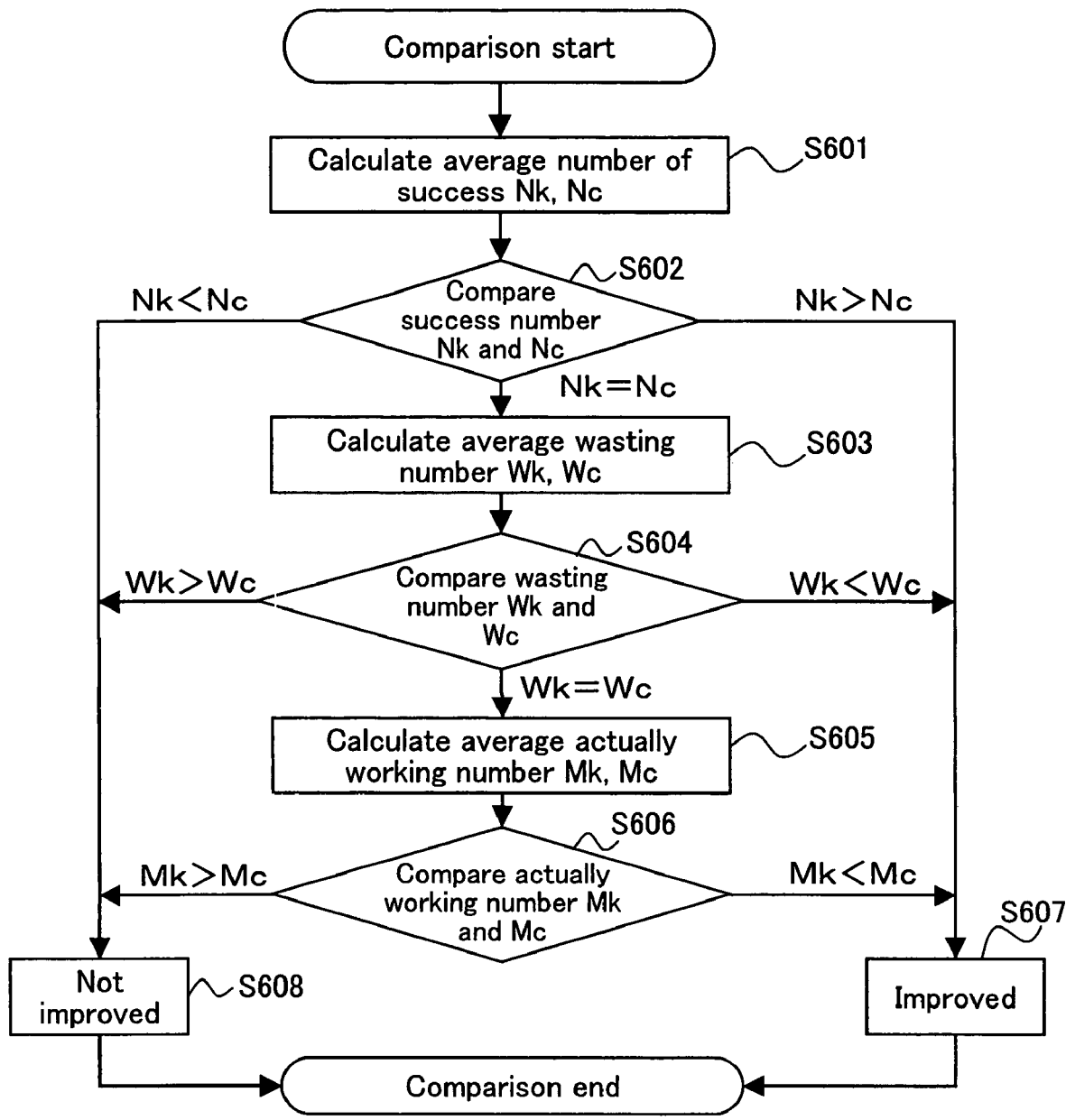
FIG. 8 is a flowchart showing one example of the process for comparing execution results.

The following describes a specific example of the comparison process (Step S6) in the flowchart of FIG. 6. FIG. 8 is a flowchart showing one example of the process where the calculation portion 72 compares the execution result based on a candidate parameter and the execution result based on the configuration parameter.

The calculation portion 72 calculates an average Nc in the whole cycles (the first to fourth cycles) concerning the number of IC tags that are successfully processed in the command execution during one cycle based on the configuration parameter and an average Nk in the whole cycles (the first to fourth cycles) concerning the number of IC tags that are successfully processed in the command execution during one cycle based on the candidate parameter (S601).

In the illustrated example of the command execution results based on the configuration parameter of FIG. 7A, the number of IC tags successfully processed by the command among the results of the first cycle is 1+2+1=4. The numbers of times of the success are 2+1+1=4 for the second cycle, 3+1=4 for the third cycle and 1+2=3 for the fourth cycle, respectively. Therefore, the average of the number of times of success during the first to fourth cycles is "3.75".

Incidentally, if the total number of times of the command execution is the same for the command execution results based on the candidate parameter and the command execution results based on the configuration parameter, a sum of the number of times of the success may be calculated instead of an average. Furthermore, in the situation where four articles move as one group and therefore it is required to access four IC tags at the same time, for example, the number of times of success may be "1" when the four IC tags have been processed successfully during the command execution of one cycle and it may be "0" when the number of IC tags processed successfully is less than 4.

The calculation portion 72 compares the average number of times of the success Nk for the candidate parameter and the average number of times of the success Nc for the configuration parameter (Step S602). If Nk>Nc, since the average number of times of the success Nk for the candidate parameter is larger, the calculation portion 72 judges that the result can be improved (Step S607). On the other hand, if Nk<N, it is judged that the result is not improved (Step S608).

If Nk=Nc, it is impossible to make such a judgment. Therefore, the calculation portion 72 calculates an average Wk of a wasting number of times of the command based on the candidate parameter and an average Wc of a wasting number of times of the command based on the configuration parameter (Step S603). The wasting number of times refers to the number of times that the command execution fails between the start of the command execution and the first success of the command. In other words, the number of commands that are executed in vain is the wasting number.

For instance, concerning the execution results of the first cycle in FIG. 7A, the command succeeds for the first time at the time "150". The number of IC tags processed successfully by the commands executed at the time "0", "50" and "100" is "0" before the command is successfully executed at the time "150". Therefore these commands are executed in vain. In this case, the wasting number of times can be "3". Similarly, the wasting number of times for the second cycle is "1", that for the third cycle is "2" and that for the fourth cycle is "4". Therefore, the average wasting number of times for the first to fourth cycles can be calculated as "3".

The calculation portion 72 compares the thus calculated Wk and Wc (Step S604). If Wk<Wc, the calculation portion 72 judges that the result can be improved because the average wasting number of times based on the candidate parameter is smaller (Step S607). On the other hand, if Wk>Wc, it is judged that the result is not improved (Step S608).

If Wk=Wc, it is impossible to make such a judgment. Therefore, the calculation portion 72 calculates an average Mk of the actually working number of times of the command based on the candidate parameter and an average Mc of the actually working number of times of the command based on the configuration parameter (Step S605). The actually working number of times refers to the number of commands required to access to a predetermined number of IC tags. The following exemplifies the case where the actually working number of times is the number of commands required to process four IC tags.

For instance, concerning the execution results for the first cycle of FIG. 7A, the command is executed three times at the time "150", "200" and "250" to process four IC tags. In this case, the actually working number of times can be "3". Similarly, the actually working number of times is "3" for the second cycle and that for the third cycle is "2". For the fourth cycle, only three IC tags are processed. In this case, the actually working number of times may be the maximum number of times that can be executed during one cycle. In this example, the actually working number of times is "7". Therefore, the average actually working number of times for the first to fourth cycles can be calculated as about "4".

The calculation portion 72 compares Mk and Mc (Step S606). If Mk<Mc, since the average actually working number of times based on the candidate parameter is smaller, which means that the process efficiency is improved, the calculation portion 72 judges that the result can be improved because (Step S607). On the other hand, if Mk>Mc, it is judged that the result is not improved (Step S608).

It should be noted here that the actually working number of times is not limited to the above-stated example, i.e., the command execution number of times required for processing four IC tags. For instance, this may be a value indicating a process efficiency of the command execution such as the number of IC tags processed per one command execution or the command execution number of times for processing one IC tag.

In this way, in the comparison process of the execution results, a comparison is made for (1) the number of IC tags that are processed successfully by the command execution, (2) the number of times that the command is executed in vain and (3) the number of times that the command is executed for processing a predetermined number of IC tags, prioritized in this stated order. As a result, data indicating whether or not the result is improved can be obtained.

The above-stated comparison process of FIG. 8 is illustrative only, and embodiments of the present invention are not limited to this. For instance, the execution results may be displayed to a user via the user interface 39, and an input indicating whether the result is improved or not may be accepted from the user through the user interface 39.

(Process Example for Setting Candidate Parameters)

Figure 9:
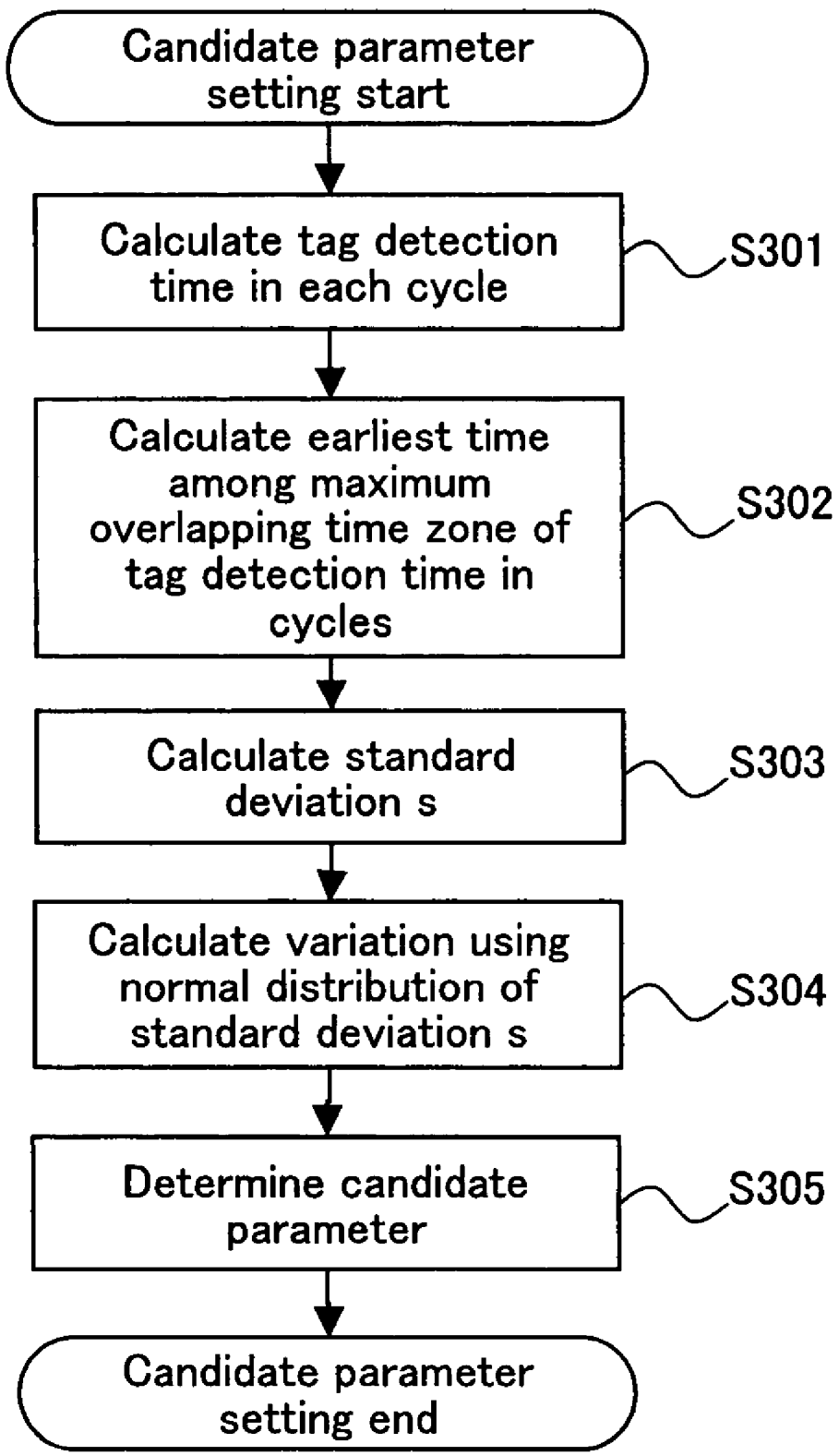
FIG. 9 is a flowchart showing one example of the process for calculating a candidate parameter.

The following describes an example of the process for calculating the candidate parameter in the flowchart of FIG. 6 (Step S3). FIG. 9 is a flowchart showing a process example by the parameter change portion 71 to calculate a candidate parameter.

The parameter change portion 71 firstly refers to the execution results of the command based on the configuration parameter to calculate a tag detection period during each cycle (Step S301). The tag detection period is a time duration from the time of the detection of a tag for the first time to the time when a tag becomes no longer detected during one cycle.

In the example of the results of FIG. 7A, when the number of IC tags to be processed during one cycle is 4, for example, the tag detection period is from the time "150" to the time "300" in the first cycle. Similarly, the tag detection period in the second cycle is from the time "50" to the time "200", and the tag detection period in the third cycle is from the time "100" to "200". Although only three tags are processed in the fourth cycle, the tag detection period is from the time "200" to "300".

Next, the parameter change portion 71 calculates how the tag detection periods of the respective cycles overlap concerning the configuration parameter and determines a minimum time $t_s$ within a maximum overlapping range (Step S302). In the example of the results of FIG. 7A, the tag detection period in the second cycle and the third cycle overlap at the time "100", and the tag detection period in the first cycle, the second cycle and the third cycle overlap at the time "150". At the time "200" or "250", the tag detection period in the first cycle and the fourth cycle overlap. Thus, the maximum overlapping time of the tag detection period is at the time "150". Therefore, the parameter change portion 71 sets the time "150" as $t_s$.

The value $t_s$ determined in Step S302 shows how many milliseconds will elapse after the execution time $t_e=T_0+(d/v)+t_p$ and before the actual tag detection is performed with a high possibility concerning the execution results as a whole. Thus, there is a high possibility that an appropriate execution time is shifted from the execution time $t_e$ by $t_s$ milliseconds. That is to say, the value determined in Step S302 shows a variation of a preferable parameter such that a possibility of improving the execution result is increased with consideration given to the execution results as a whole.

It should be noted here that the above describes the example where $t_s$ is the minimum time within a time zone where the tag detection periods of the respective cycles overlap. However, the way of calculating $t_s$ is not limited to this.

Next, the parameter change portion 71 determines a standard deviation s based on the time $t_s$ (Step S303). The determined standard deviation s is recorded in the result storage portion 73. If $t_s>0$, the parameter change portion 71 makes the standard deviation $s=t_s$. If $t_s=0$, since there is a possibility of missing a peak of the possibility of the tag detection, the parameter change portion 71 uses a standard deviation set initially as the standard deviation s.

Figure 10:
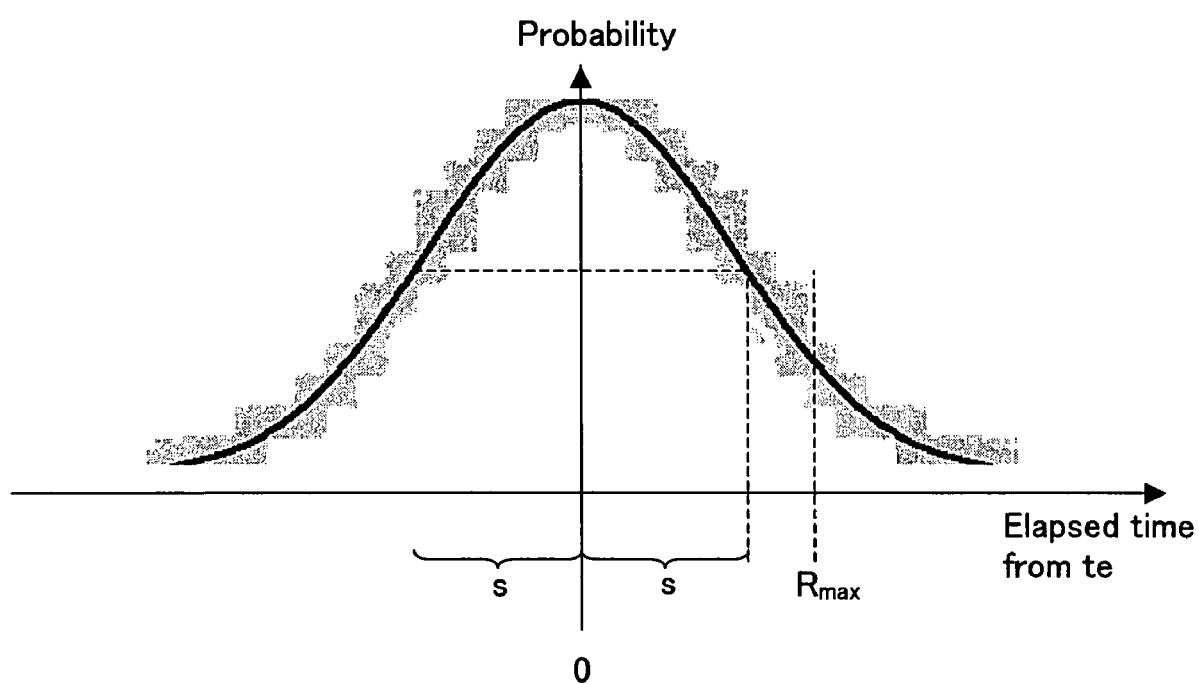
FIG. 10 is a graph representing the normal distribution with the average of $t_s$ and the standard deviation s.

The parameter change portion 71 determines a variation of a parameter using a normal distribution with the standard deviation s (Step S304). For instance, a positive random number ran is generated, which is in accordance with a normal distribution with the average of 0 and the standard deviation s. The random number ran is a variation from the configuration parameter. The random number ran is generated within a predetermined range. FIG. 10 is a graph representing the normal distribution with the average of 0 and the standard deviation s. In the graph of FIG. 10, the vertical axis shows a probability and the horizontal axis shows an elapsed time from $t_e$, i.e., a variation of the parameter. In the normal distribution of FIG. 10, the probability of occurrence of 0 is the highest, and the probability of occurrence of values between $-t_s$ and $t_e$ is about 68.2%. The parameter change portion 71 sets $R_{max}$ as the maximum value, and generates the random number ran within the range of $0<ran<R_{max}$.

The parameter change portion 71 calculates a candidate parameter by adding the random number ran to the configuration parameter $(t_p)$ $(t_p+ran)$ (Step S305). Herein, if $t_s=0$, the parameter change portion 71 multiplies the random number ran by −1 to reverse the sign. If $t_s=0$, there is a possibility of missing a peak of the possibility of the tag detection, which means that the execution timing indicated by the configuration parameter is too late. Therefore, if $t_s=0$, the parameter change portion 71 makes ran a negative value, thereby setting the command execution timing indicated by the candidate parameter earlier than the execution timing indicated by the configuration parameter.

According to the above-stated process of FIG. 9, the parameter change portion 71 can calculate a candidate parameter using a random number ran in accordance with a normal distribution having an average that is a preferable variation $t_s$. It should be noted here that the normal distribution used here is illustrative only, and a candidate parameter may be calculated using the other types of probability distribution.

Embodiment 2

Figure 11:
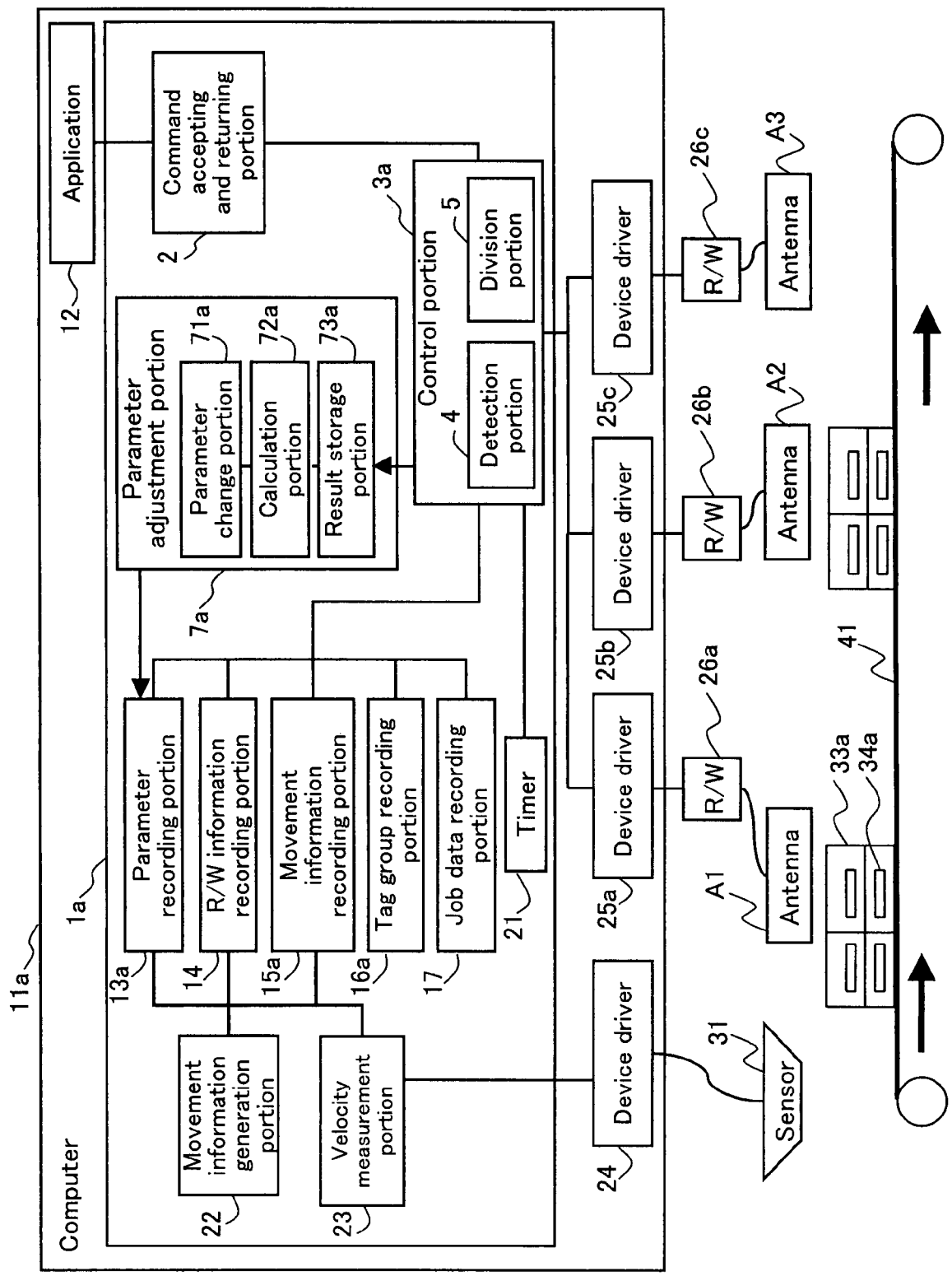
FIG. 11 is a functional diagram showing the overall configuration of a system including a tag access control system of Embodiment 2.

FIG. 11 is a functional diagram showing the overall configuration of a system including a tag access control system of the present embodiment. In FIG. 11, the same reference numerals are assigned to the same elements as those in FIG. 1. The tag access control system 1a of FIG. 11 is implemented by a computer 11a executing tag access control in accordance with predetermined software. The computer 11a is connected with a sensor 31 and R/Ws 26a, 26b and 26c.

The R/Ws 26a, 26b and 26c are provided with antennas A1, A2 and A3, respectively. The R/W 26a transmits/receives data by radio with IC tags located within a communication range of the antenna A1. Similarly, the R/W 26b and the R/W 26c also transmit/receive data by radio with IC tags located within communication ranges of the antennas A2 and A3, respectively. One R/W may be provided with one antenna, or may be provided with a plurality of antennas.

In the illustrated example of FIG. 11, the antennas A1, A2 and A3 are aligned at constant intervals. A belt conveyor 41 is disposed along the alignment direction of the antennas A1, A2 and A3. In this way, an article 33a mounted on the belt conveyor 41 moves so as to pass through the communication ranges of the antennas A1, A2 and A3 sequentially. The article 33a is provided with an IC tag 34a.

Upstream of the belt conveyor 41 is provided with the sensor 31. The sensor 31 detects the velocity of an article that moves on the belt conveyor 41 and enters the communication range of the antenna A1.

Software operating the computer 11a includes an application 12 for issuing a command for transmitting/receiving data with an IC tag, for example. The tag access control system 1a is implemented by middleware under the application 12 that allows the computer 11a to execute a process for controlling the R/Ws 26a, 26b and 26c and the sensor 31. The application 12 is software for carrying out a process control, a distribution management, a production management or the like, for example.

Furthermore, the computer 11a is provided with a device driver 24 for controlling the sensor 31 and device drivers 25a, 25b and 25c for respectively controlling the R/Ws 26a, 26b and 26c. The tag access control system 1a can control the R/Ws 26a, 26b and 26c via the device drivers 25a, 25b and 25c.

The tag access control system 1a includes a command accepting and returning portion 2, a control portion 3a, a detection portion 4, a division portion 5, a parameter recording portion 13a, a R/W information recording portion 14, a movement information recording portion 15a, a tag group recording portion 16a, a job data recording portion 17, a timer 21, a movement information generation portion 22 and a velocity measurement portion 23.

The command accepting and returning portion 2 is an interface section between the application 12 and the tag access control system 1a. The command accepting and returning portion 2 accepts from the application 12 a command for writing data in an IC tag or a command for reading data from an IC tag, for example. Further, the command accepting and returning portion 2 returns a result of processing the accepted command to the application 12.

The division portion 5 generates a plurality of divided commands for executing the command accepted by the command accepting and returning portion 2. In other words, the division portion 5 divides the command into a plurality of smaller commands. Parameters in the parameter recording portion 13 include a parameter on information for dividing a command, and the division portion 5 divides a command using this parameter. The parameter for dividing a command includes, for example, a parameter indicating a relationship between a size of accessed data and a time required for access (e.g., an access time increasing rate h described later). The divided commands generated by the division portion 5 are recorded in the job data recording portion 17 as job data, for example.

The detection portion 4 makes the R/Ws 26a, 26b and 26c detect IDs of IC tags located within the communication ranges of their respective antennas. The command accepted by the command accepting and returning portion 2 is executed, for example, on each IC tag of the ID detected by the detection portion 4. In that case, data associating the IDs of the IC tags detected by the detection portion 4 and the plurality of divided commands generated by the division portion 5 with each other are recorded in the job data recording portion 17. Moreover, the detection portion 4 also may record IDs of a predetermined number of IC tags in the tag group recording portion 16a, for example.

The parameters in the parameter recording portion 13 include a parameter on information for detecting an ID of an IC tag, and the detection portion 4 detects an ID of an IC tag using this parameter. The parameter for the ID detection of an IC tag includes, for example, a parameter indicating detection timing (e.g., a correction parameter $t_{p1}$ described later), a parameter indicating number of tags detected collectively as a group (e.g., an expected tag number M described later), or a time required for the detection.

When the detection portion 4 gives any one of the R/Ws 26a, 26b and 26c an instruction to detect an ID of an IC tag located within the communication range of the antenna, the R/W given this instruction can detect IDs of a plurality of IC tags located within the communication range of the antenna provided in the R/W by utilizing a technology called collision arbitration, for example.

The control portion 3a sequentially assigns the R/Ws 26a, 26b and 26c the plurality of divided commands associated with the IC tags of the IDs detected by the detection portion 4 and makes them execute these commands. The control portion 3a distributes and sequentially sends the plurality of divided commands to the R/Ws 26a, 26b and 26c. Communication between the R/W 26a, 26b, 26c and the IC tag is carried out according to a communication scheme defined by ISO 15693 or ISO 18000-6, for example.

The velocity measurement portion 23 measures a moving velocity of the article 33a moving on the belt conveyor 41 using the sensor 31 and records the same in the movement information recording portion 15a. The movement information generation portion 22 generates information indicating a time period when an IC tag is present within the communication range of each of the antennas A1, A2 and A3 using the moving velocity measured by the velocity measurement portion 23 and R/W information recorded in the R/W information recording portion 14, and records the same in the movement information recording portion 15a. The following describes a specific example of the information generated by the movement information generation portion 22.

Figure 13:
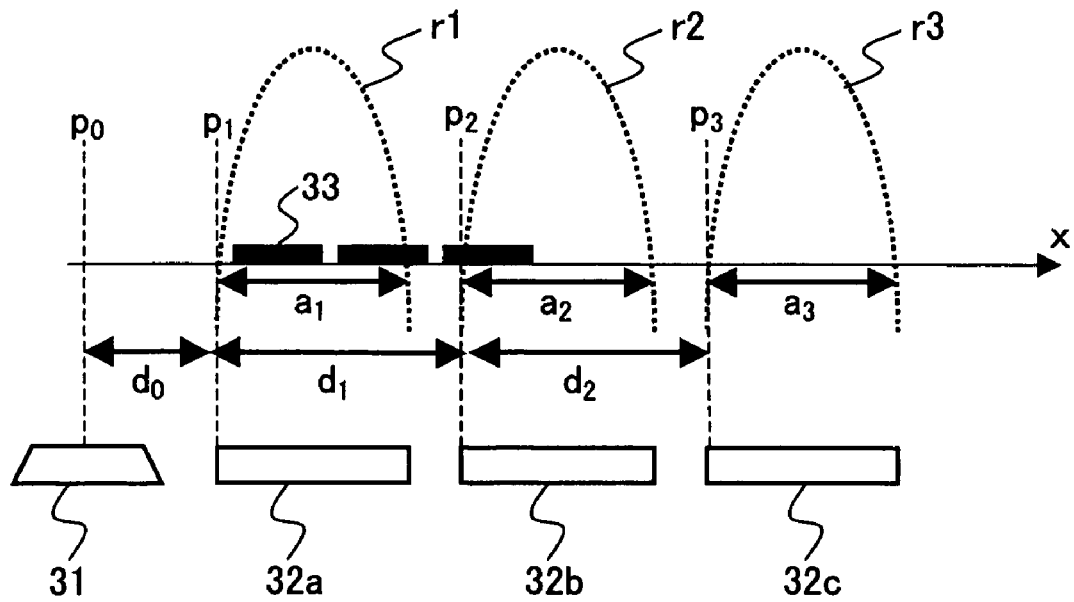
FIG. 13 schematically shows an example of the data contained in the R/W information.

The R/W information is data indicating, for example, the number of antennas provided in the R/Ws 26a, 26b and 26c, a position of each antenna, an interval between antennas, a size of the communication range of each antenna, etc. FIG. 13 schematically shows an example of the data contained in the R/W information. In FIG. 13, the X-axis indicates the positions of the antennas A1, A2 and A3 along their alignment direction. In FIG. 13, dotted lines r1, r2 and r3 represent the communication ranges of the antennas A1, A2 and A3, respectively. Positions p1, p2 and p3 on the X-axis can be set to values representing the positions of the antennas A1, A2 and A3, respectively. Furthermore, lengths a1, a2 and a3 indicate the lengths of the communication ranges of the respective antennas A1, A2 and A3 in the X-axis direction. A length $d_0$ indicates a distance between p0 and p1, a length d1 indicates a distance between p1 and p2, and a length d2 indicates a distance between p2 and p3.

Using the positions p1, p2 and p3, the lengths a1, a2, a3, $d_0$, $d_1$ and $d_2$ that are shown in FIG. 13 and the time $T_0$ and the velocity v that are measured by the velocity measurement portion 23, the movement information generation portion 22 can generate movement information indicating the time period when an IC tag is present within the communication ranges of the plurality of antennas. The movement information is recorded in the movement information recording portion 15a. The movement information is data indicating, for example, times $T_1$, $T_2$ and $T_3$ at which the article enters the communication ranges of the respective antennas A1, A2 and A3 and time periods $T_{a1}$, $T_{a2}$ and $T_{a3}$ when the article is present within the communication ranges of the respective antennas A1, A2 and A3.

Figure 14:
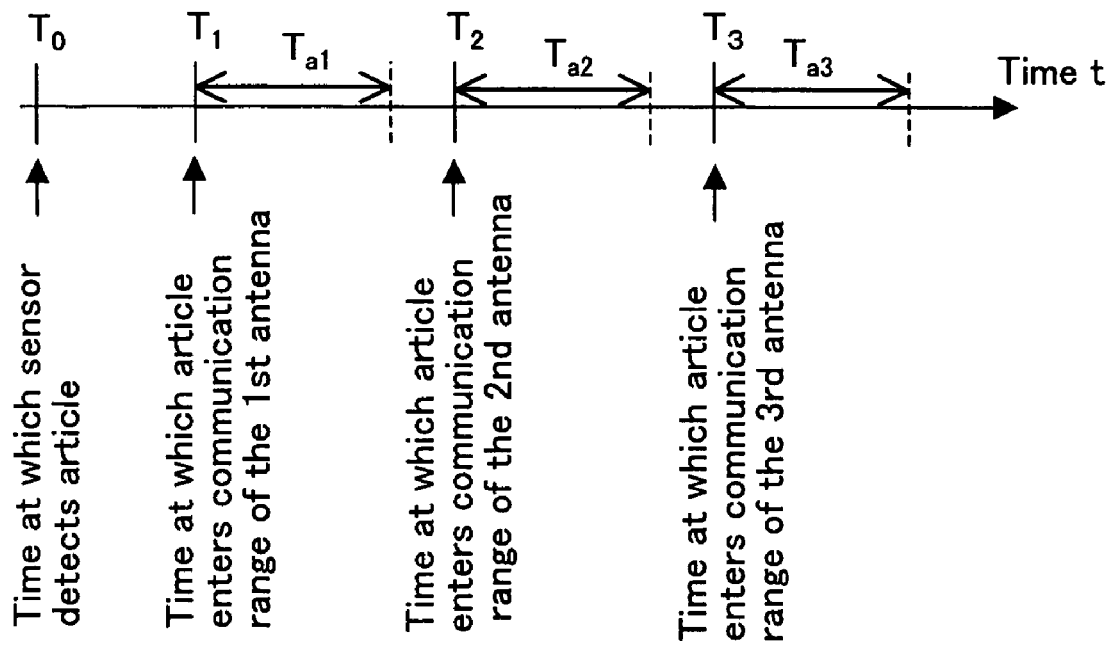
FIG. 14 schematically shows examples of the times $T_1$, $T_2$ and $T_3$ and the time periods $T_{a1}$, $T_{a2}$ and $T_{a3}$.

FIG. 14 schematically shows examples of the times $T_1$, $T_2$ and $T_3$ and the time periods $T_{a1}$, $T_{a2}$ and $T_{a3}$. In FIG. 14, the horizontal axis indicates a transition of time. The movement information generation portion 22 calculates the times $T_1$, $T_2$ and $T_3$ and the time periods $T_{a1}$, $T_{a2}$ and $T_{a3}$ as shown in FIG. 14 and records the same in the movement information recording portion 15a. These values are utilized in the operation described later.

Using the movement information recorded in the movement information recording portion 15a, the R/W information recorded in the R/W information recording portion 14 and a present time obtained by the timer 21, the control portion 3a can predict a position and a time of an IC tag moving on the belt conveyor 41. The control portion 3a uses the predicted position and time to assign the R/Ws 26a, 26b and 26c the plurality of divided commands at execution timing according to the movement of the IC tag.

However, there is a deviation between the predicted position and time and the actual position and time. The parameter recording portion 13a records correction parameters $t_{p1}$ to $t_{p3}$ for correcting such a deviation. In accordance with execution timing corrected by these parameters $t_{p1}$ to $t_{p3}$, the control portion 3a can assign the R/Ws 26a, 26b and 26c a plurality of divided commands at execution timing according to the actual movement of the IC tag.

In this way, the parameter recording portion 13a records parameters for controlling data communication by the respective R/Ws 26a, 26b and 26c. For instance, the parameter recording portion 13a includes a parameter indicating information for dividing a command, a parameter indicating information for detection, a parameter indicating execution timing of divided commands for each of the R/Ws 26a, 26b and 26c and the like.

FIG. 15 shows an exemplary table showing parameters recorded in the parameter recording portion 13a. In the example of FIG. 15, parameter names, antenna IDs and values are associated with one another and are recorded. As exemplary data indicating execution timing of divided commands, execution time correction parameters ($t_{p1}$ to $t_{p3}$) respectively are associated with antennas A1 to A3 and are recorded. Furthermore, as an exemplary parameter indicating information for detection, an expected tag number M is recorded. As an exemplary parameter indicating information of dividing a command, an access time increasing rate h is recorded. Since the expected tag number M and the access time increasing rate h do not vary between antennas, they are associated with data concerning all of the antennas (all) and are recorded.

The following describes an operation conducted by the tag access control system 1a. Similarly to Embodiment 1, the tag access control system 1a also operates in two modes including an actual operation mode and a parameter adjustment mode.

(Data Access Process to IC Tag in Actual Operation Mode)

Figure 12:
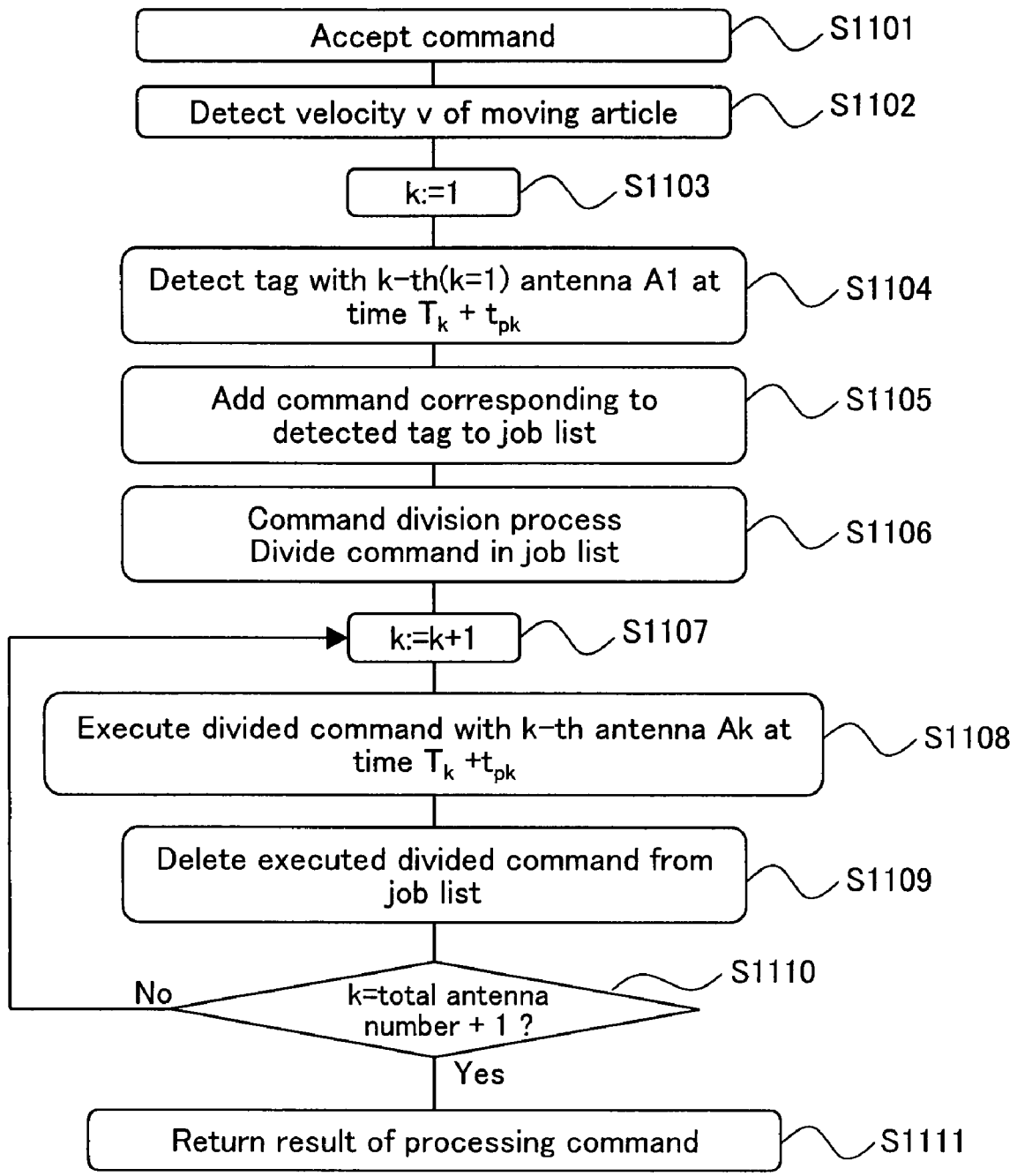
FIG. 12 is a flowchart showing an example of the process since a tag access control system 1a accepts a command and processes it until it returns the result of the processing.

Firstly, an example of a process in which the tag access control system 1a controls the R/Ws 26a, 26b and 26c and sends/receives data to/from an IC tag according to a command from the application 12. FIG. 12 is a flowchart showing an example of a process since the tag access control system 1a accepts a command from the application 12, it performs processing according to this command until it returns the result of the processing.

In the process shown in FIG. 12, the command accepting and returning portion 2 first accepts a command from the application 12 (Step S1101). The command is, for example, an instruction to write data in an IC tag or an instruction to read data from an IC tag, which has a configuration similar to the example of FIGS. 5A and 5B.

Hereinafter, the case in which the command accepting and returning portion 2 accepts the command to read out data from an IC tag will be described as an example. After accepting the command, the velocity measuring portion 23 activates the sensor 31 and waits until the sensor 31 detects the article 33a. When the sensor 31 detects the moving article 33a, the velocity measuring portion 23 measures its velocity v (Step S1102).

The velocity measuring portion 23 acquires a time $T_0$ at which the sensor detects the article 33a from the timer 21 and records it in the movement information recording portion 15a. Using the time $T_0$, the velocity v and R/W information in the R/W information recording portion 14, the movement information generation portion 22 calculates times $T_1$, $T_2$ and $T_3$ at which the article 33a enters the communication ranges of the antennas A1, A2 and A3, respectively, and time periods $T_{a1}$, $T_{a2}$ and $T_{a3}$ when the article 33a is present within the communication ranges of the antennas A1, A2 and A3, respectively.

The control portion 3a initializes a variable k (Step S1103). For instance, k is set to 1. In this case, k=1 means that the antenna to be processed is the first antenna (namely, the antenna A1).

The detection portion 4 detects a tag via the first antenna A1 at the time $T_k + t_{pk}$ ($=T_1 + t_{p1}$) (Step S1104). Herein, the time $T1 + t_{p1}$ is calculated, for example, by the following (Equation 1) using the time $T_0$ recorded in the movement information recording portion 15a, the velocity v, $d_0$ recorded in the R/W information recording portion 14 and the correction parameter $t_{p1}$ recorded in the parameter recording portion 13a.

$$T_0+(d_0/v)+t_{p1}. \quad \text{(Equation 1)}$$

Similarly, $T_k+t_{pk}$ is calculated by the following (Equation 2) as follows:

$$T_k+t_{pk}=T_{k-1}+(d_{k-1}/v)+t_{pk}. \quad \text{(Equation 2)}$$

The detection portion 4, for example, issues a detection command for detecting the ID of the IC tag located within the communication range of the antenna A1 with respect to the R/W 26a a predetermined number of times (e.g., R times).

Furthermore, the detection portion 4 may issue the detection command repeatedly until IDs of IC tags in number corresponding to the expected tag number M are detected. The expected tag number M is a value representing the number of IC tags to be processed with one command, for example. As stated above, the expected tag number M is recorded in the parameter recording portion 13a beforehand. For instance, in the case where it is determined beforehand that four articles are packed together to be moved, M=4 is recorded.

The detection portion 4 adds a set of data configured with the detected IC tag IDs and the command accepted by the command accepting and returning portion 2 to a job list (Step S1105). The job list is data in which a plurality of sets of data each configured with IDs of IC tags and command are recorded. The process for executing a command is represented with data called a job. The job list is recorded as a part of job data in the job data recording portion 17, for example.

FIG. 16A illustrates an example of the job list in which the IC tag IDs detected by the detection portion 4 are recorded. A job list 50a shown in FIG. 16A is an exemplary job list in the case where the command accepting and returning portion 2 accepts the command shown in FIG. 5A, for instance. The job list 50a is configured with a list of data containing a data portion 51 representing an ID of an IC tag and a data portion 52a representing a command. The data portion 52a representing a command contains a READ instruction, an offset indicating a position of starting reading and a byte count indicating the amount of data to be read, similarly to the command shown in FIG. 5A. The job list illustrated by FIG. 16A shows that the command shown in FIG. 5A is executed on each of the IC tags whose IDs ($t_1, t_2, t_3, \ldots t_1$) are detected by the detection portion 4.

In the case where the detection portion 4 detects again the IC tag ID that is already added to the job list, it is preferable not to add that ID to the job list. This avoids duplicate registration of the same IDs.

The division portion 5 performs a process of dividing a command (Step S1106). In the dividing process, the division portion 5 further divides the command associated with the IC tag ID added to the job list in Step S1105 into a plurality of divided commands, thus generating a new job list.

FIG. 16B illustrates an example of a job list 50b newly generated by dividing the command contained in the job list 50a shown in FIG. 16A by the division portion 5. The division portion 5, for example, divides the command for each IC tag ID into a plurality of divided commands. For instance, a command associated with IC tag ID=$t_1$ indicates an instruction to read 10 bytes of data from the top (0) of a memory of the IC tag. The division portion 5 can divide this command into, for example, a divided command $J_1$ to read 5 bytes of data from the top (0) of the memory of the IC tag and a divided command $J_2$ to read 5 bytes of data from the fifth byte from the top of the memory of the IC tag.

As one example, the following is a description of the case where the command before division is an instruction to read b bytes of data from the f-th byte from the top of the memory of the IC tag (offset=f, the byte count=b) and where this command is divided into m divided commands $J_1, J_2, J_3, \ldots J_m$. When s is the smallest integer that is not smaller than b/m, the divided commands $J_1, J_2, J_3, \ldots J_m$ after division can be represented as $J_1$: offset=f, the byte count=s $J_2$: offset=f+s, the byte count=s $J_3$: offset=f+2s, the byte count=s

. . .

$J_m$: offset=f+ms, the byte count=b−(m−1)s.

As described above, the division portion 5 can divide the data to be read from the IC tag indicated by the command into a plurality of pieces of data and generate a plurality of divided commands to read each piece of the plurality of divided data. Similarly, it is also possible to divide the command to write data in the IC tag into a plurality of divided commands to write the plurality of pieces of divided data.

Here, it is preferable that the division number m is determined based on, for example, the amount of data to be read by the command before division and the communicable time period between an IC tag and a plurality of R/Ws. A process in which the division portion 5 calculates the division number m and generates the divided commands will be described in detail below.

The control portion 3a adds 1 to the variable k (Step S1107). The control portion 3a makes the k-th R/W (in the case of k=2, the R/W 26b) execute the divided commands generated by the dividing portion 5 via an antenna Ak (e.g., in the case of k=2, the antenna A2) at the time $T_k+t_{pk}$ (e.g., in the case of k=2, $T_2=T_1+\{(d_1)/v\}+t_{p2}$) (Step S1108). For example, the control portion 3a sends the R/W the divided commands $J_1$ and $J_2$ of IC tag ID=$t_1$ in the job list 50b shown in FIG. 16B one by one sequentially and acquires the results of processing the divided commands $J_1$ and $J_2$. Similarly, the control portion 3a sends the divided commands contained respectively in IC tag ID=$t_2, t_3 \ldots$ one by one sequentially and acquires the results of processing the individual divided commands.

In the case where the results of processing the divided commands are not successful a predetermined times consecutively, for example, the control portion 3a may end the divided command executing operation via the antenna Ak (Step S1108). In this manner, as long as an IC tag is present within the communication range of the antenna Ak and unless the divided commands are unsuccessful, the divided command executing operation is continued.

It should be noted that the control portion 3a may end the divided command executing operation (Step S1108) after a certain time period has elapsed. Also, when all the divided commands in the job list are executed, the divided command executing operation (Step S1108) ends.

The control portion 3a deletes the divided command whose processing result is successful in the divided command executing operation (Step S1108) via the antenna Ak from the job list (Step S1109). In this manner, only an unexecuted divided command or a divided command whose execution has been failed remains in the job list. As a result, a divided command that needs to be executed is selected and remains in the job list.

FIG. 16C illustrates an example of the job list obtained by deleting the successful divided commands from the job list 50b shown in FIG. 16B. In the job list 50c shown in FIG. 16C, the divided command of IC tag ID=$t_1$ and the divided commands $J_1$ and $J_2$ of IC tag ID=$t_2$ are deleted from the divided commands contained in the job list 50b.

Moreover, it is preferable that the results of processing the divided commands are stored in the job data recording portion 17. FIG. 17 illustrates an example of data representing the results of processing the divided commands. In the example shown in FIG. 17, data representing the division number, completion and divided command are stored for each IC tag ID. The control portion 3a updates the data representing the completion of the IC tag IDs whose results of processing the divided commands are all successful to "1", for example. In this manner, information indicating whether or not the processing is completed is recorded for each IC tag.

Furthermore, data indicating the results of processing for each tag group, which is a group of IC tags, may be recorded in the tag group recording portion 16a. FIG. 18 illustrates an example of data representing the result of processing for each tag group. In the example shown in FIG. 18, for each tag group ID, data representing the completion and data representing IDs of IC tags (member IC tags) included in a tag group of that tag group ID are recorded. In this way, information indicating whether or not the processing is completed is recorded for each tag group. The control portion 3a can update the results of processing for each tag group based on the result of processing for each IC tag, for example.

For instance, it is preferable that a group of IC tags to be processed by one command accepted by the command accepting and returning portion 2 from the application 12 is handled as one tag group. In this way, the result of processing for each tag group represents the result of processing for each command.

The control portion 3a judges whether or not the variable k has reached the number obtained by adding 1 to the number of all antennas controlled by the tag access control system 1a (in this case 3+1=4) (Step If k=2, for example, k has not reached 4, which is the number obtained by adding 1 to the total antenna number (No in Step S1110). Thus, the control portion 3a performs the process of Step S1107 again. In Step S1107, k is incremented. Thereafter, the control portion 3a repeats the process in Steps S1108 and S1109. At this time, in the job list, as shown in FIG. 16C, for example, the divided command executed via the k−1th antenna A(k−1) is deleted. In this way, the above-stated operation is repeated until k has reached the total antenna number+1.

If k has reached the total antenna number+1 (Yes in Step S1110), the command accepting and returning portion 2 generates a result of processing the command based on the result of processing the divided command for each IC tag, and returns it to the application 12 (Step S111). In the case where the tag group is created for each command, the command accepting and returning portion 2 can return the result of processing for each tag group shown in FIG. 18 to the application 12 as the result of processing the command.

(Specific Example of Operation in which the Division Portion 5 Divides Command or Divided Command)

Figure 19:
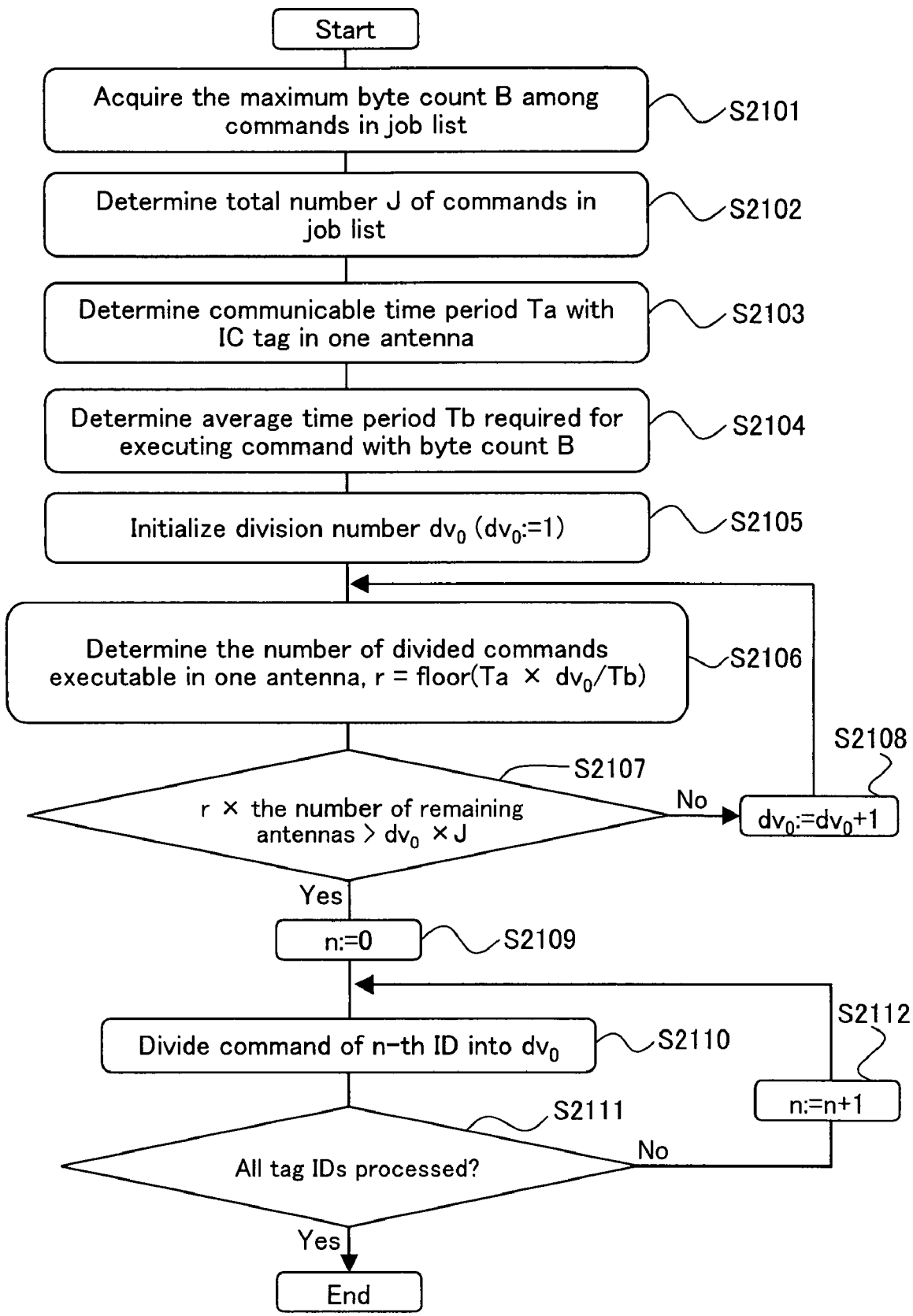
FIG. 19 is a flowchart showing a specific example of the process for dividing a command in a job list.

Herein, a specific example of the command dividing operation in Step S1106 will be described. FIG. 19 is a flowchart showing a specific example of an operation in which the division portion 5 divides a command in the job list. As shown in FIG. 19, the division portion 5 first acquires the byte count B of the divided command whose handling data have the largest byte count among the divided commands contained in the job list (Step S2101).

Further, the division portion 5 determines the total number J of divided commands contained in the job list (Step S2102). Then, the division portion 5 determines a time period Ta for which the communication with a single IC tag can be carried out via one antenna (Step S2103). For example, Ta can be determined by Ta=a/v using a length a of a communication range of the antenna and a moving velocity v of an article.

The division portion 5 determines an average time period Tb required for executing the divided command handling the data as much as the byte count B (Step S2104). For example, Tb can be calculated by Tb=B×h using the access time increasing rate h recorded in the parameter recording portion 13a beforehand. In a graph whose horizontal axis shows the amount of data to be accessed and vertical axis shows a time required for access, a relationship between the amount of data and the time required for access to the data is represented by a straight line. The gradient of this straight line is the access time increasing rate h. In the example of the data of the parameter recording portion 13a of FIG. 15, the value of the access time increasing rate h is "1.2 (µs/byte)". In this case, the time required for access to the 10 bytes of data will be 120 µseconds, for example.

The value of this access time increasing rate h is affected by objects and persons surrounding the antennas A1 to A3. Therefore, an appropriate value of the access time increasing rate h cannot be obtained until the tag access control system 1a operates actually. Thus, the operation in the parameter adjustment mode of the tag access control system 1a allows the parameter adjustment portion 7a to adjust the access time increasing rate h to an appropriate value. An exemplary operation of the parameter adjustment will be described later.

Next, the division portion 5 sets a division number $d_{v0}$ to 1 so as to initialize the $d_{v0}$ (Step S2105).

The division portion 5 determines the number r of divided commands executable via one antenna (Step S2106). For example, using the communicable time period Ta for which the communication with the same IC tag can be carried out via one antenna, the division number $d_{v0}$ and the average time period Tb required for execution of the divided command with the byte count B, the division portion 5 can determine the number r of divided commands executable via one antenna by Equation 3 below.

$$r=\text{floor}(Ta \times d_{v0}/Tb). \quad \text{(Equation 3)}$$

In Equation 3 above, floor (X) represents the largest integer that does not exceed X.

The division portion 5 judges whether or not a value obtained by multiplying r with the number of remaining antennas exceeds $d_{v0} \times J$ (Step S2107). In the case of No in Step S2107, 1 is added to $d_{v0}$ (Step S2108), r is calculated again (Step S2106), and then judgment is conducted whether or not the r×the number of remaining antennas exceeds $d_{v0} \times J$ (Step S2107). Until r×the number of remaining antennas exceeds $d_{v0} \times J$ (Yes in Step S2107), the operations of adding 1 to $d_{v0}$ and calculating r are repeated.

If r×the number of remaining antennas exceeds $d_{v0} \times J$ (Yes in Step S2107), the division portion 5 initializes a loop counter n (n:=0) (Step S2109) and divides a command of the n-th ID into $d_{v0}$ (Step S2110). The division portion 5 repeats the division operation in Step S2110 with respect to divided commands of all tag IDs residing in the job list (Steps S2111, S2112). Thus, according to the operation of FIG. 19, commands in the job list can be divided.

(Parameter Adjustment Process in Parameter Adjustment Mode)

Figure 20:
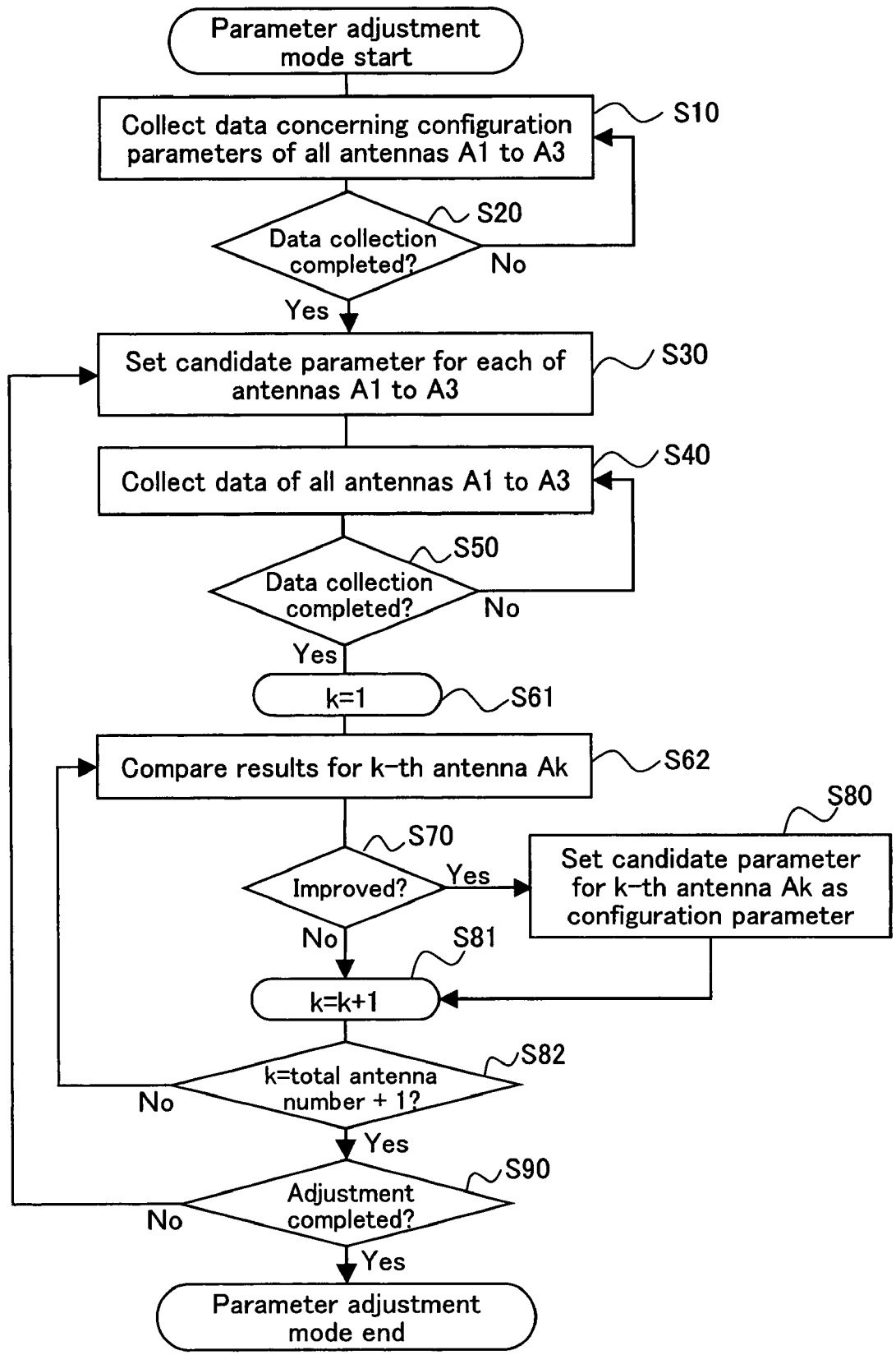
FIG. 20 is a flowchart showing an exemplary operation for determining an appropriate value while adjusting a parameter.

The following describes an exemplary operation conducted by the tag access control system 1a in the parameter adjustment mode. FIG. 20 is a flowchart showing an exemplary operation conducted by the parameter adjustment portion 7a for determining an appropriate value while adjusting a parameter in the parameter adjustment mode. The following description exemplifies the case where the correction parameters $t_{p1}$, $t_{p2}$ and $t_{p3}$ of FIG. 15 are adjusted, but parameters adjusted by the parameter adjustment portion 7a are not limited to these.

The flow of the process shown in FIG. 20 is broadly similar to the process shown in FIG. 6. That is to say, the parameter adjustment portion 7a collects an execution result for each of the configuration parameter and candidate parameters, and makes a comparison of them. If it is judged that the execution result is improved by a certain candidate parameter, then the configuration parameter is changed to the candidate parameter. By repeating this process a plurality of times, the configuration parameter can be closer to an appropriate value.

When the parameter adjustment mode is started, the control portion 3a generates a command based on the currently set parameter in the parameter recording portion 13a, and collects data indicating an execution result when the command is executed by the R/W 26a (Step S1). The control portion 3a repeats the execution of the same command a plurality of times to obtain a plurality of execution results (Step S20).

For instance, the detection portion 4 makes the R/W 26a execute a divided command to detect an ID of an IC tag located within the communication range of the antenna A1 at the time $T_1+t_{p1}$. Thereafter, the detection portion 4 makes the R/W 26a execute the same command a plurality of times at intervals of 50 milliseconds. The detection portion 4 records, for each command, the number of IC tags whose IDs have been successfully detected in the result storage portion 73a as an execution result. After that, at the time $T_2+t_{p2}$, the control portion 3a makes the R/W 26b execute a divided command to read data in an IC tag located within the communication range of the antenna A2, and then makes the R/W 26b execute the same command a plurality of number of times at intervals of 50 milliseconds. Similarly, from the following time $T_3+t_{p3}$, the control portion 3a makes the R/W 26c execute a series of divided commands to read data of an IC tag located with in the communication range of the antenna A3. The control portion 3a records, for each divided command, the number of the IC tags whose data have been read successfully in the result storage portion 73a as execution results. In this way, a series of commands that are executed while an article passes through the communication ranges of the antennas A1, A2 and A3 is considered as one cycle. The control portion 3a repeats this cycle a plurality of times, whereby execution results for the configuration parameter corresponding to a plurality of cycles can be recorded in the result storage portion 73a. The configuration parameter and the execution results are associated with each other and are recorded.

FIG. 21A shows one example of data indicating execution results. An ID (=0001) is assigned to the data of the execution results of FIG. 21A in order to recognize what types of values of parameters are indicated by the execution results.

Each recorded ID has a value of the parameter associated therewith. FIG. 21B shows one example of a table where IDs and parameters are associated with each other and recorded. In FIG. 21B, each recorded ID has values of the parameters $t_{p1}$, $t_{p2}$ and $t_{p3}$ associated therewith.

The data of the execution results in FIG. 21A correspond to the ID (=0001). This shows the values of the parameters corresponding to ID=0001 of FIG. 21B, i.e., the command execution results in the case of $t_{p1}=30$, $t_{p2}=20$ and $t_{p3}=30$.

In the illustrated example of FIG. 21A, the time when the divided command has been executed and the result of the execution of the divided command are associated with each other and recorded for the first to fourth cycles. The divided command execution time is represented for each of the antennas A1, A2 and A3 in terms of the elapsed time from the time $T_k+t_{pk}=T_{k-1}+(d_{k-1}/v)+t_{pk}$ when the R/Ws 26a, 26b and 26c of the antennas A1, A2 and A3 start to execute the divided commands regarded as the time "0" (in terms of milliseconds). The execution results for the antenna A1 are represented by the number of IC tags that are detected. The executions results for the antennas A2 and A3 are represented by the number of IC tags whose data have been successfully read.

As shown in the execution results of FIG. 21A, the execution results for the antennas A1, A2 and A3 corresponding to the four cycles are recorded in the result storage portion 73a, for example. Then, the parameter change portion 71a uses the execution results recorded in the result storage portion 73a to calculate a candidate parameter for each of the antennas A1, A2 and A3 (Step S30). The parameter change portion 71a, for example, extracts the execution timing having the best execution result based on the execution results recorded in the result storage portion 73a for each of the antennas A1, A2 and A3, and calculates a candidate parameter for each of the antennas A1, A2 and A3 so as to increase a possibility of the calculated candidate parameter indicating a value around such as execution timing. The detailed example of the process for calculating a candidate parameter is similar to the process shown in FIG. 9. The calculated candidate parameters are recorded in the result storage portion 73a.

The candidate parameters are added to the table shown in FIG. 21B, for example. Herein, it is assumed that the parameters $t_{p1}=20$, $t_{p2}=30$ and $t_{p3}=40$ are the calculated candidate parameters that are associated with the ID (=0002) and recorded in the table of FIG. 21B, as one example.

The control portion 3a makes each of the R/Ws 26a, 26b and 26c corresponding to the antennas A1, A2 and A3 to execute the divided command based on the candidate parameter ($t_{p1}=20$, $t_{p2}=30$, $t_{p3}=40$) calculated by the parameter change portion 71a a plurality of times, and collects data indicating the execution results (Steps S40, S50). The data indicating the execution results are recorded in the result storage portion 73a. The process in Steps S40 and S50 are conducted in a similar manner to the process of the above-stated Steps S10 and S20. The execution results collected in Steps S40 and S50 also are recorded to have a configuration similar to that of the data of FIG. 21A. At this time, the data of the execution results are associated with the ID (=0002) of the candidate parameter calculated in Step S30 and recorded.

When the results of the divided command execution based on the candidate parameter are recorded, the calculation portion 72a initializes the variable k (Step S61), and compares the result of the divided command execution based on the candidate parameter and the result of the divided command execution based on the configuration parameter concerning the k-th antenna Ak (Step S62). The details of the comparison process is similar to the process shown in FIG. 8.

If data indicating that the execution result is improved for the k-th antenna Ak is obtained (Yes in Step S70), the parameter change portion 71a records the candidate parameter for the antenna Ak as the configuration parameter $t_{pk}$ for the antenna Ak in the parameter recording portion 13a (Step S80). If data indicating that the execution result is not improved is obtained (No in Step S70), the configuration parameter recorded in the parameter recording portion 13a is not changed.

After that, the calculation portion 72a increments k and judges whether or not k has reached the total antenna number+1 (3+1=4) (Step S82). In this manner, the comparison process (Step S62) is conducted for all of the antennas A1 to A3.

If k has reached the total antenna number+1 (YES in the Step S82), the calculation portion 72a makes a judgment whether or not the parameter adjustment should be completed (Step S90). The process from Steps S30 to S80 is repeated until it is judged that the parameter adjustment should be completed (Yes in Step S90). As the process from Steps S30 to S80 is repeated, the parameters $t_{p1}$ to $t_{p3}$ for the antennas A1 to A3 are adjusted to appropriate values. In this manner, the control portion 3a allows each of the R/Ws 26a to 26c to execute the divided command at appropriate timing.

The present invention can be utilized, for example, at a production site such as a factory or a distribution site between a factory, a warehouse, a wholesale and a retail or the like for the purpose of improving an efficiency of a process control or a warehousing and delivery management. The fields in which the present invention can be utilized are fields of production and distribution where an application of IC tags to articles such as components, products and cases, for example, is becoming widespread.

The present invention is applicable as a tag access control system capable of setting an appropriate parameter for controlling a reader/writer.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A tag access control system that controls data communication between a plurality of the reader/writers and one or more IC tags within a radio communication range of an antenna held by each of the plurality of the reader/writers comprises:
   a command accepting portion that accepts a command indicating an instruction to write data in the IC tag or an instruction to read data from the IC tag;
   a division portion that generates a plurality of divided commands for executing an instruction indicated by the accepted command;
   a parameter recording portion that stores a parameter for controlling the data communication by each of the plurality of reader/writers,
   a parameter change portion that changes the parameter concerning the plurality of reader/writers a plurality of times;
   the control portion that sends the plurality of divided commands to the plurality of reader/writers successively based on the parameter and that receives an execution result of each of the plurality of divided commands from each of the plurality of reader/writers,
   a result storage portion that stores execution results of the plurality of divided commands that the control portion sends to the plurality of reader/writers based on each of a plurality of parameters that are changed by the parameter change portion, the execution results respectively being associated with the parameters on which the divided commands are based; and
   a calculation portion that calculates an appropriate parameter for the plurality of reader/writers based on the parameters and the execution results of the divided commands stored in the result storage portion.

2. A tag access control method that controls data communication between a plurality of reader/writers and one or more IC tags within a radio communication range of the antenna held by each of the plurality of reader/writers using a computer, the method comprising:
   accepting a command indicating an instruction to write data in the IC tag or an instruction to read data from the IC tag;
   generating a plurality of divided commands for executing an instruction indicated by the accepted command;
   changing a parameter for controlling the data communication by each of the plurality of reader/writers a plurality of times, the parameter being recorded in a parameter recording portion held by the computer;
   sending the plurality of divided commands to the plurality of reader/writers successively based on the plurality of parameters changed by the changing;
   receiving a execution result of each of the plurality of divided commands from each of the plurality of reader/writers;
   recording execution results of the plurality of divided commands that are sent to the plurality of reader/writers based on each of a plurality of parameters that are changed by the changing, the execution results respectively being associated with the parameters on which the divided commands are based; and
   calculating an appropriate parameter for the plurality of reader/writers based on the parameters and the execution results of the divided commands stored at the recording.

3. A computer program product stored on a tangible computer readable recording medium for controlling a computer that control data communication between a plurality of reader/writers and one or more IC tags within a radio communication range of an antenna held by each of the plurality of reader/writers, the computer program product comprising computer executable instructions that cause:
   a command accepting portion held by a computer to accept a command indicating an instruction to write data in the IC tag or an instruction to read data from the IC tag;
   a division portion held by the computer to generate a plurality of divided commands for executing an instruction indicated by the accepted command;
   a parameter portion held by the computer to change a parameter for controlling the data communication by each of the plurality of reader writers a plurality of times, the parameter being recorded in a parameter recording portion held by the computer;
   a control portion held by the computer to send the plurality of divided commands to the plurality of reader/writers successively based on the plurality of parameters changed by the parameter change portion;
   the control portion to receive a execution result of each of the plurality of divided commands from each of the plurality of reader/writers;
   the control portion to record, in the result storage portion held by the computer, execution results of the plurality of divided commands that are sent to the plurality of reader/writers based on each of a plurality of parameters that are changed by the changing, the execution results respectively being associated with the parameters on which the divided commands are based; and
   a calculating portion held by the computer to calculate an appropriate parameter for the plurality of reader/writers based on the parameters and the execution results of the divided commands stored in the result storage portion.

* * * * *

UNITED STATES PATENT AND TRADEMARK OFFICE
CERTIFICATE OF CORRECTION

PATENT NO.         : 7,669,767 B2
APPLICATION NO.    : 11/717761
DATED              : March 2, 2010
INVENTOR(S)        : Hiroyasu Sugano It is certified that error appears in the above-identified patent and that said Letters Patent is hereby corrected as shown below:

Column 26, Line 44, change "reader writers" to --reader/writers--.

Signed and Sealed this

Twenty-fifth Day of May, 2010

David J. Kappos
*Director of the United States Patent and Trademark Office*